US011880677B2

(12) United States Patent
Sinha et al.

(10) Patent No.: US 11,880,677 B2
(45) Date of Patent: Jan. 23, 2024

(54) BUILDING SYSTEM WITH DIGITAL NETWORK TWIN

(71) Applicant: Johnson Controls Tyco IP Holdings LLP, Milwaukee, WI (US)

(72) Inventors: Sudhi R. Sinha, Milwaukee, WI (US); Youngchoon Park, Brookfield, WI (US); Sujith Ebenezer, Milwaukee, WI (US); Justin Ploegert, Cudahy, WI (US); Karl F. Reichenberger, Mequon, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 18/087,191

(22) Filed: Dec. 22, 2022

(65) Prior Publication Data
US 2023/0195448 A1 Jun. 22, 2023

Related U.S. Application Data

(63) Continuation of application No. 17/221,064, filed on Apr. 2, 2021, now Pat. No. 11,537,386.
(Continued)

(51) Int. Cl.
*G06F 8/65* (2018.01)
*H04L 12/46* (2006.01)
*G06F 9/455* (2018.01)

(52) U.S. Cl.
CPC ............ *G06F 8/65* (2013.01); *H04L 12/4641* (2013.01); *G06F 9/45558* (2013.01); *G06F 2009/45595* (2013.01)

(58) Field of Classification Search
USPC ........................................................ 717/172
See application file for complete search history.

(56) References Cited

U.S. PATENT DOCUMENTS

| 5,301,109 A | 4/1994 | Landauer et al. |
| 5,446,677 A | 8/1995 | Jensen et al. |

(Continued)

FOREIGN PATENT DOCUMENTS

| CN | 101415011 A | 4/2009 |
| CN | 102136099 A | 7/2011 |

(Continued)

OTHER PUBLICATIONS

Balaji et al., "Brick: Metadata schema for portable smart building applications," Applied Energy, 2018 (20 pages).
(Continued)

*Primary Examiner* — Qing Chen
*Assistant Examiner* — Clint Thatcher
(74) *Attorney, Agent, or Firm* — Foley & Lardner LLP

(57) ABSTRACT

A building network system of a building includes a network system. The network system includes one or more processing circuits. The one or more processing circuits are configured to receive network data from a building network of the building, the network data associated with a plurality of pieces of building equipment of the building. The one or more processing circuits are configured to generate a digital network twin of the building network based on the network data, the digital network twin representing the plurality of pieces of building equipment and relationships between the plurality of pieces of building equipment. The one or more processing circuits are configured to identify one or more network updates to the building network based on the digital network twin. The one or more processing circuits are configured to deploy the one or more network updates to the building network.

20 Claims, 21 Drawing Sheets

Related U.S. Application Data

(60) Provisional application No. 63/005,858, filed on Apr. 6, 2020.

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,350,671 B2 | 5/2016 | Zou et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,817,383 B1 | 11/2017 | Sinha et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,705,492 B2 | 7/2020 | Harvey |
| 10,708,078 B2 | 7/2020 | Harvey |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 10,986,675 B2 | 4/2021 | Sternberg et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,375,374 B1 | 6/2022 | Hua et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |

(56) References Cited

U.S. PATENT DOCUMENTS

| | | |
|---|---|---|
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |

(56) References Cited

U.S. PATENT DOCUMENTS

| | | |
|---|---|---|
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gartner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0309818 A1 | 10/2018 | Park et al. |
| 2018/0313561 A1 | 11/2018 | Sinha et al. |
| 2018/0328612 A1 | 11/2018 | Sinha et al. |
| 2018/0336785 A1 | 11/2018 | Ghannam et al. |
| 2018/0337823 A1 | 11/2018 | Zhang et al. |
| 2018/0351652 A1 | 12/2018 | Ashrafi |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0017719 A1 | 1/2019 | Sinha et al. |
| 2019/0025771 A1 | 1/2019 | Park et al. |
| 2019/0026359 A1 | 1/2019 | Park et al. |
| 2019/0037135 A1 | 1/2019 | Hedge |
| 2019/0042988 A1 | 2/2019 | Brown et al. |
| 2019/0052549 A1 | 2/2019 | Duggal et al. |
| 2019/0088106 A1 | 3/2019 | Grundstrom |
| 2019/0094824 A1 | 3/2019 | Xie et al. |
| 2019/0095519 A1 | 3/2019 | Park et al. |
| 2019/0095644 A1 | 3/2019 | Park et al. |
| 2019/0096217 A1 | 3/2019 | Pourmohammad et al. |
| 2019/0102840 A1 | 4/2019 | Perl et al. |
| 2019/0109768 A1 | 4/2019 | Senarath et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0223055 A1 | 7/2019 | Bor Yaliniz et al. |
| 2019/0268178 A1 | 8/2019 | Fairweather et al. |
| 2019/0310979 A1 | 10/2019 | Masuzaki et al. |
| 2019/0361411 A1 | 11/2019 | Park et al. |
| 2019/0361412 A1 | 11/2019 | Park et al. |
| 2020/0007407 A1* | 1/2020 | Ito .................. H04L 43/20 |
| 2020/0133978 A1 | 4/2020 | Ramamurti et al. |
| 2020/0162325 A1* | 5/2020 | Desai ............... H04L 41/122 |
| 2020/0226156 A1 | 7/2020 | Borra et al. |
| 2020/0285203 A1 | 9/2020 | Thakur et al. |
| 2020/0328942 A1* | 10/2020 | Jalan ................ H04L 41/40 |
| 2020/0401576 A1* | 12/2020 | Yerli ................. G06T 7/70 |
| 2021/0042299 A1 | 2/2021 | Migliori |
| 2021/0083965 A1 | 3/2021 | Taft et al. |
| 2021/0120023 A1* | 4/2021 | Gupta ............... H04L 41/082 |
| 2021/0360083 A1 | 11/2021 | Duggal et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

Balaji et al., "Brick: Metadata schema for portable smart building applications," Applied Energy, Sep. 15, 2018, 3 pages, (Abstract).

Balaji et al., "Demo Abstract: Portable Queries Using the Brick Schema for Building Applications," BuildSys '16, Palo Alto, CA, USA, Nov. 16-17, 2016 (2 pages).

Balaji, B. et al., "Brick: Towards a Unified Metadata Schema for Buildings." BuildSys '16, Palo Alto, CA, USA, Nov. 16-17, 2016 (10 pages).

Bhattacharya et al., "Short Paper: Analyzing Metadata Schemas for Buildings—The Good, the Bad and the Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

(56) References Cited

OTHER PUBLICATIONS

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv- 01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 20- Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 1, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, Ny, USA, Nov. 13-14, 2019 (10 pages).
Fierro et al., "Dataset: An Open Dataset and Collection Tool for BMS Point Labels," Data'19, New York, Ny, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/Feb. 21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
Infineon, "5G—The high-speed mobile network of the future," URL: https://www.infineon.com/cms/en/discoveries/mobile-communication-5g, page last updated Feb. 2018, retrieved from the internet Apr. 6, 2021, 14 pages.
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Joon, "How developments in the telecom industry change the way you should engage your audience," URL: https://joon.us/how-developments-in-the-telecom-industry-change-the-way-you-should-engage-your-audience/, retrieved from the internet Apr. 6, 2021, 3 pages.
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).

(56) References Cited

OTHER PUBLICATIONS

Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
MeLampy, Patrick, "5G Network Slicing and Enterprise Networking," URL: https://www.onug.net/blog/5g-network-slicing-and-enterprise-networking/, Nov. 20, 2018, 3 pages.
Network Simulator Projects, "Ns2 Software Defined Network," URL: http://networksimulator2.com/ns2-software-defined-network/, retrieved from internet Apr. 7, 2021, 4 pages.
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Patel et al., "Mobile-Edge Computing—Introductory Technical White Paper," ETSI Issue 1, Sep. 2014, 36 pages.
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and PARK, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing LTD., Birmingham, UK, Oct. 2014 (170 pages).
Sparks et al., FCC Technological Advisory Council, 5G IoT Working Group, "5G Network Slicing Whitepaper," URL: https://transition.fcc.gov/bureaus/oet/tac/tacdocs/reports/2018/5G-Network-Slicing-Whitepaper-Finalv80.pdf, retrieved from internet Apr. 7, 2021, 34 pages.
The Virtual Nuclear Tourist, "Calvert Cliffs Nuclear Power Plant," URL: http://www.nucleartourist.com/US/calvert.htm, Jan. 11, 2006 (2 pages).
University of California at Berkeley, Eecs Department, "Enabling Scalable Smart- Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-US/blog/announcing-azure-digital-twins-create-digital-replicas-of-spaces-and-infrastructure-using-cloud-ai-and-iot/, Sep. 24, 2018 (11 pages).
W3C, "Sparql: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Wikipedia, "Mobile edge computing," URL: https://en.wikipedia.org/wiki/Mobile_edge_computing, page last edited Mar. 9, 2021, retrieved from internet Apr. 6, 2021, 4 pages.
Zhou, Q et al., "Knowledge-infused and Consistent Complex Event Processing over Real-time and Persistent Streams," Further Generation Computer Systems, 2017, 76 (pp. 391-406).

\* cited by examiner

BUILDING SYSTEM WITH DIGITAL NETWORK TWIN

CROSS-REFERENCE TO RELATED PATENT APPLICATIONS

This application is a continuation of U.S. patent application Ser. No. 17/221,064 filed Apr. 2, 2021 which claims the benefit and priority to U.S. Provisional Patent Application No. 63/005,858 filed Apr. 6, 2020, the entirety of which is incorporated by reference herein.

BACKGROUND

This application relates to wireless networking in a building. More specifically, this application relates to fifth generation (5G) cellular communication for a building. 5G cellular communication provides advantages such as increased bandwidth, increased uplink speed, increased downlink speed, and various advantages relating to virtual networking and other features. 5G, however, is difficult to implement in a building because of the wavelength (millimeter waves) used in 5G. More specifically, because of the high frequency range used in 5G, signals can be absorbed by walls, ceilings, or other elements of a building, making 5G communication for building equipment of a building difficult to implement.

SUMMARY

Unified Building 5G Gateway

A building network system of a building including a unified network gateway, the unified network gateway including one or more radio communication circuits configured to communicate via a millimeter wave based network and one or more other building networks and one or more processing circuits configured to collect building data from building devices of the building via at least one of the millimeter wave based network or the one or more other building networks. The one or more processors are configured to communicate the building data to a building system via the millimeter wave based network.

In some embodiments, the millimeter wave based network is a fifth generation (5G) cellular network.

In some embodiments, the one or more other building networks include at least one of Zigbee, Wi-Fi, Bluetooth, or Zwave.

In some embodiments, the one or more processing circuits are configured to facilitate communication between a user device and a cellular base station of the millimeter wave based network by communicating with the user device and at least one of the cellular base station or one or more small cell network nodes of the millimeter wave based network, the one or more small cell network nodes in communication with the cellular base station.

In some embodiments, the one or more processing circuits are configured to perform a building control algorithm based on the building data to generate a control decision and communicate the control decision to the building system via the millimeter wave based network.

In some embodiments, the one or more processing circuits are configured to communicate the building data to a building cloud platform via the millimeter wave based network, receive control data generated by the building cloud platform based on the building data via the millimeter wave based network, and perform at least one of communicating the control data to the building system via the millimeter wave based network or communicating the control data to the building devices of the building via the one or more other building networks or the millimeter wave based network.

In some embodiments, the one or more processing circuits are configured to communicate the building data to the building cloud platform via the millimeter wave based network through a cellular base station, wherein the cellular base station provides a gateway between the millimeter wave based network and the Internet.

In some embodiments, the one or more processing circuits are configured to communicate the building data to the building system via the millimeter wave based network by communicating the building data to the building system through one or more small cell network nodes of the millimeter wave based network.

In some embodiments, the one or more small cell network nodes are located within the building or outside the building.

Building Device Ledger Based on 5G

Another implementation of the present disclosure is a building device of a building, the building device including one or more communications circuits configured to communicate with building devices via a millimeter wave based network and one or more processing circuits configured to maintain a copy of a distributed ledger stored by the building device by communicating with at least some of the building devices via the millimeter wave based network. The one or more processing circuits are configured to push at least part of the copy of the distributed ledger to the building devices via the millimeter wave based network to update other copies of the distributed ledger stored on the building devices.

In some embodiments, the millimeter wave based network is a fifth generation (5G) cellular network.

In some embodiments, the distributed ledger is a blockchain ledger including blocks each including a nonce, block data, a hash of a previous block, and a current block hash. In some embodiments, the current block hash is a hash of the block data, the hash of the previous block, and the nonce. In some embodiments, the nonce causes the hash of the current block to meet a difficulty requirement.

In some embodiments, the one or more processing circuits are configured to authenticate a software subscription based on subscription information included within the copy of the distributed ledger stored by the processing circuit.

In some embodiments, the one or more processing circuits are configured to determine, based on information of the copy of the distributed ledger, that one building device of the building devices is compromised and stop communicating with the building device to isolate the one building device from the millimeter wave network.

In some embodiments, the one or more processing circuits are configured to implement a cognitive agent, wherein the cognitive agent is configured to maintain the copy of the distributed ledger and push the at least part of the copy of the distributed ledger to the building devices via the millimeter wave based network.

In some embodiments, the one or more processing circuits are configured to receive, via the millimeter wave network, the cognitive agent from an agent network manager, wherein the agent network manager generates the cognitive agent based on a cognitive agent template and pushes the cognitive agent to the building device and implement the cognitive agent in response to receiving the cognitive agent from the agent network manager.

In some embodiments, the one or more processing circuits are configured to collect performance data from one building device of the building devices via the millimeter wave based network, update the copy of a distributed ledger stored by the building device based on the performance data, and push at least part of the copy of the distributed ledger to the building devices via the millimeter wave in response to updating the copy of the distributed ledger.

In some embodiments, the one or more processing circuits are configured to analyze the performance data to determine whether the one building device of the building devices is compromised and update the copy of the distributed ledger by causing the copy of the distributed ledger to include an indication that the one building device is compromised.

In some embodiments, the indication that the one building device is compromised is a risk score, wherein a value of the risk score greater than a predefined level indicates that the one building device is compromised. In some embodiments, the one or more processing circuits are configured to analyze the performance data by generating the risk score.

Line Of Sight And Best Friend Identification

Another implementation of the present disclosure is a building network system of a building including a building device of building devices, the building device including one or more network communications circuits configured to communicate with a millimeter wave network within the building and one or more processing circuits configured to cause the one or more network communications circuits to attempt to communicate with each of the building devices via the millimeter wave network. The one or more processing circuits are configured to determine, via the one or more network communications circuits, network data indicative of communication with each of the building devices and determine, based on the network data, that one or more of the building devices are in a line of sight with the building device.

In some embodiments, the millimeter wave based network is a fifth generation (5G) cellular network.

In some embodiments, at least one building device of building devices is a beamformer device, wherein the beamformer device is configured to communicate ad-hoc with at least some of the building devices by generating a directional signal via antenna of the beamformer device.

In some embodiments, the one or more processing circuits are configured to cause the one or more network communications circuits to attempt to communicate with each of the building devices via the millimeter wave network ad-hoc and record individual ad-hoc network data for each of the building devices based on the attempt to communicate ad-hoc.

In some embodiments, the network data includes at least one of one or more response time indications, one or more signal strength indications, or one or more indications of no response.

In some embodiments, the one or more processing circuits are configured to select a first building device from the building devices based on the network data and push communication data received ad-hoc from the first building device to the millimeter wave network.

In some embodiments, the one or more processing circuits are configured to select a first building device from the building devices based on the network data and direct communication of the building device for the millimeter wave network through the first building device.

In some embodiments, the one or more processing circuits are configured to select the first building device from the building devices at a first point in time. In some embodiments, the one or more processing circuits are configured to select a second building device from the building devices at a second point in time after the first point in time based on new network data collected after the first point in time and direct communication of the building device for the millimeter wave network through the second building device.

Dynamic Configuration of Virtual Networks to Compensate for Obstructions

Another implementation of the present disclosure is a building network system of a building including a network system, the network system including one or more processing circuits configured to collect communication data of multiple building devices communicating on a millimeter wave based network, wherein the building includes multiple physical obstructions that obstruct signals of the millimeter wave based network. The one or more processing circuits are configured to determine, based on the communication data, indications of the multiple physical obstructions of the building, generate a network configuration for a virtual network, the network configuration causing the virtual network to compensate for the multiple physical obstructions, and deploy the virtual network based on the network configuration.

In some embodiments, the millimeter wave based network is a fifth generation (5G) cellular network.

In some embodiments, the one or more processing circuits are configured to deploy the virtual network with software defined networking (SDN) and network function virtualization (NFV) by causing routing of nodes of the millimeter wave based network to be performed in a control layer remote from the nodes of the millimeter wave based network and network functions of the virtual network to be implemented in virtual machines remote from the nodes of the millimeter wave based network.

In some embodiments, the one or more processing circuits deploy the virtual network with other different virtual networks over a common physical network infrastructure of the millimeter wave based network.

In some embodiments, the one or more processing circuits are configured to determine the indications of the multiple physical obstructions of by building by analyzing at least one of data communication paths of the millimeter wave network, signal strengths between nodes of the millimeter wave network, or data transmission times between the nodes of the millimeter wave network.

In some embodiments, the one or more processing circuits are configured to deploy the virtual network based on the network configuration to a set of building device configured to communicate via the millimeter wave network, wherein network communications of the set of building devices is affected by the one or more physical obstructions.

In some embodiments, the virtual network implements data routing through the set of building devices that avoids the one or more physical obstructions.

In some embodiments, the virtual network causes the set of building devices to implement a particular form of data compression on data of the set of building devices to be communicated via the millimeter wave network.

In some embodiments, the virtual network implements one or more communication restrictions on the set of building devices, wherein the set of restrictions restrict at least one of uplink data communication on the millimeter wave network or downlink data communication on the millimeter wave network.

Dynamic Configuration of Network Resources

Another implementation of the present disclosure is a building network system of a building including one or more processing circuits configured to generate virtual networks, each virtual network of the virtual networks generated for one building equipment group of building equipment groups. The one or more processing circuits are configured to deploy the virtual networks on network infrastructure of the building, generate updates to the virtual networks to address resource changes in at least one of the building equipment groups, and deploy the updates to the virtual networks.

In some embodiments, the one or more processing circuits are configured to deploy the virtual networks with software defined networking (SDN) and network function virtualization (NFV) by causing routing of nodes of a millimeter wave based network to be performed in a control layer remote from the nodes of the millimeter wave based network and network functions of the virtual network to be implemented in virtual machines remote from the nodes of the millimeter wave based network.

In some embodiments, the one or more processing circuits are configured to receive identifying information of a building device via the network infrastructure, select, based on the identifying information, one virtual network of the virtual networks, and cause the building device to communicate on the one virtual network.

In some embodiments, the virtual networks include at least one of a heating, ventilation, and air conditioning (HVAC) virtual network, wherein HVAC devices of the building communicate on the HVAC virtual network, a building security network, wherein building security devices of the building communicate on the building security network, a fire detection and response network, wherein fire detection and response devices communicate on the fire detection and response network, a camera surveillance network, wherein security cameras of the building communicate on the camera surveillance network, or an access control system network, wherein devices of an access control system of the building communicate on the access control system network.

In some embodiments, each of the virtual networks has a different uplink level or a downlink level.

In some embodiments, at least some of the virtual networks each implement a different network security profile.

In some embodiments, the one or more processing circuits are configured to generate the updates to the virtual networks by determining a number of building devices communicating on each of the virtual networks and generating the updates to the virtual networks based on the number of building devices communicating on each of the virtual networks.

In some embodiments, the one or more processing circuits are configured to generate the updates to the virtual networks based on a current time of day.

In some embodiments, the one or more processing circuits are configured to generate the updates to the virtual networks based on an occupancy level of the building.

In some embodiments, the network infrastructure of the building is an infrastructure of a millimeter wave based network.

In some embodiments, the millimeter wave based network is a fifth generation (5G) cellular network.

Another implementation of the present disclosure is a method including generating, by a processing circuit, virtual networks, each virtual network of the virtual networks generated for one building equipment group of building equipment groups. The method includes deploying, by the processing circuit, the virtual networks on network infrastructure of the building, generating, by the processing circuit, updates to the virtual networks to address resource changes in at least one of the building equipment groups, and deploying, by the processing circuit, the updates to the virtual networks.

In some embodiments, the method includes receiving, by the processing circuit, identifying information of a building device via the network infrastructure, selecting, by the processing circuit, based on the identifying information, one virtual network of the virtual networks, and causing, by the processing circuit, the building device to communicate on the one virtual network.

In some embodiments, the virtual networks include at least one of a heating, ventilation, and air conditioning (HVAC) virtual network, wherein HVAC devices of the building communicate on the HVAC virtual network, a building security network, wherein building security devices of the building communicate on the building security network, a fire detection and response network, wherein fire detection and response devices communicate on the fire detection and response network, a camera surveillance network, wherein security cameras of the building communicate on the camera surveillance network, or an access control system network, wherein devices of an access control system of the building communicate on the access control system network.

In some embodiments, each of the virtual networks has a different uplink level or a downlink level. In some embodiments, at least some of the virtual networks each implement a different network security profile.

In some embodiments, the method includes generating, by the processing circuit, the updates to the virtual networks including determining a number of building devices communicating on each of the virtual networks and generating the updates to the virtual networks based on the number of building devices communicating on each of the virtual networks.

In some embodiments, the method includes generating, by the processing circuit, the updates to the virtual networks is based on a current time of day.

In some embodiments, the method further includes generating, by the processing circuit, the updates to the virtual networks based on an occupancy level of the building.

In some embodiments, the network infrastructure of the building is an infrastructure of a fifth generation (5G) cellular network.

Another implementation of the present disclosure is a building network system of a building including one or more memory devices including instructions thereon, that, when executed by one or more processors, cause the one or more processors to generate virtual networks, each virtual network of the virtual networks generated for one building equipment group of building equipment groups. The instructions cause the one or more processors to deploy the virtual networks on network infrastructure of the building, generate updates to the virtual networks to address resource changes in at least one of the building equipment groups, and deploy the updates to the virtual networks.

Building Network Twin

Another implementation of the present disclosure is a building network system of a building including a network system, the network system including one or more processing circuits configured to receive network data from a building network of the building, the network data associated with pieces of building equipment of the building. The one or more processing circuits are configured to generate a digital network twin of the building network based on the network data, the digital network twin representing the pieces of building equipment and relationships between the pieces of building equipment, identify one or more network updates to the building network based on the digital network twin, and deploy the one or more network updates to the building network.

In some embodiments, the relationships between the pieces of building equipment are at least one of operational relationships indicating a first piece of building equipment operating a second piece of building equipment or a network communication relationship indicating network communications associated with the first piece of building equipment and the second piece of building equipment.

In some embodiments, the one or more updates include one or more routing updates to rout data through the building network or one or more network function updates to implement or modify one or more network functions of the building network.

In some embodiments, the one or more processing circuits are configured to generate a user interface indicating the one or more network updates and including an element to approve the one or more network updates or reject the one or more network updates, cause a user device of a user to display the user interface and receive an interaction with one of the element to approve the one or more network updates or the element reject the one or more network updates, and deploy the one or more network updates to the building network in response to a reception of the interaction with the element to approve the one or more network updates.

In some embodiments, the network infrastructure of the building is an infrastructure of a millimeter wave based network.

In some embodiments, the millimeter wave based network is a fifth generation (5G) cellular network.

In some embodiments, the digital network twin is a network knowledge graph including nodes and edges between the nodes, wherein the network knowledge graph represents the pieces of building equipment with the nodes and the relationships between the pieces of building equipment with the edges.

In some embodiments, the network knowledge graph includes a second nodes representing network infrastructure devices that are at least one of inside the building or outside the building, wherein the network infrastructure devices are at least one of network switches, network routers, small cell network nodes, or cellular base stations.

In some embodiments, the network knowledge graph includes second nodes representing spaces of the building and second edges between the nodes and the second nodes. In some embodiments, the second edges indicate that the pieces of building equipment are located in the spaces of the building.

Building Network 5G Agents

Another implementation of the present disclosure is a building network system of a building including a network system, the network system including one or more processing circuits configured to identify one or more target building nodes of a building network, each of the one or more target building nodes utilizing a network service. The one or more processing circuits are configured to retrieve a network agent template, the network agent template defining a network agent configured to perform machine learning and the network service, generate one or more network agents based on the network agent template, wherein each of the one or more network agents is generated for one of the one or more target building nodes, and deploy the one or more network agents to the one or more target building nodes.

In some embodiments, the one or more processing circuits are configured to deploy the one or more network agents to the one or more target building nodes by communicating the one or more network agents to the one or more target building nodes via the building network. In some embodiments, each of the one or more target building nodes is configured to execute one of the one or more network agents in response to receiving the one or more network agents via the building network.

In some embodiments, the one or more processing circuits are configured to deploy the one or more network agents to the one or more target building nodes by communicating the one or more network agents to a network function virtualization (NFV) layer, wherein each of the one or more network agents are virtualized network functions. In some embodiments, the NFV layer is configured to execute the one or more network agents for the one or more target building nodes.

In some embodiments, the one or more agents include at least one of a network supervisor agent configured to manage network traffic of the building network, a distributed ledger agent configured to implement a ledger across the building nodes, and a network load management agent configured to load balance the building nodes.

In some embodiments, the building network is a millimeter wave based network.

In some embodiments, the millimeter wave based network is a fifth generation (5G) cellular network.

Multi-Antenna Design Placement for a 5G Building Device

Another implementation of the present disclosure is a device design system of designing a building device, the device design system including one or more processing circuits configured to receive one or more design characteristics of a building device, wherein the building device is a radio based building device configured to communicate via a millimeter wave network. The one or more processing circuits are configured to generate an optimization problem based on the design characteristics of the building device and execute the optimization problem to determine one or more design recommendations for the building device, the one or more design recommendations including an antenna implementation recommendation in the building device, wherein the antenna are configured to communicate via the millimeter wave network.

In some embodiments, the millimeter wave based network is a fifth generation (5G) cellular network.

In some embodiments, the one or more design characteristics include a three dimensional design model of the building device.

In some embodiments, the one or more design characteristics include a circuit board model indicating one or more electrical components of the building device and electrical connection routing between the one or more electrical components.

In some embodiments, the one or more processing circuits are configured to generate a design file for the building device based on the one or more design recommendations and the one or more design characteristics of the building device.

In some embodiments, the one or more design recommendations are recommendations to move one or more components from one or more first locations on a circuit board of the building device to one or more second locations on the circuit board.

In some embodiments, the optimization problem includes an indication of a radiation pattern for the building device based on different numbers of the antenna and different positions of the antenna within the building device. In some embodiments, the antenna implementation recommendation includes a number of antenna and a location within the building device for each of the number of antenna.

In some embodiments, the one or more design recommendations include a circuit board layout of a circuit board of the building device, wherein the circuit board layout includes an indication of each of the number of antenna in a location on the circuit board.

In some embodiments, the circuit board layout further includes one or more connection routing recommendations for the circuit board, the one or more connection routing recommendations indicating electrical connections between components of the circuit board, the components including the number of antenna.

Building Layout for 5G Networks

Another implementation of the present disclosure is a building design system of designing a building, the building design system including one or more processing circuits configured to receive one or more design characteristics of a building, wherein the building includes a physical network infrastructure for a millimeter wave network. The one or more processing circuits are configured to generate an optimization problem based on the design characteristics of the building and execute the optimization problem to determine one or more design recommendations for the building, the one or more design recommendations including one or more recommendations for the physical construction of the building and one or more design recommendations for the physical network infrastructure.

In some embodiments, the millimeter wave based network is a fifth generation (5G) cellular network.

In some embodiments, the optimization problem include an indication of a line of sight between areas of the building and between devices of the network infrastructure. In some embodiments, the one or more processing circuits are configured to execute the optimization problem to optimize the line of sight between the areas of the building and between the devices of the network infrastructure.

In some embodiments, the one or more design recommendations for the building include at least one of moving one or more walls of the building from a first location to a second location or changing a dimension of the one or more walls from a first value to a second value.

In some embodiments, the one or more design recommendations for the building include at least one of moving one or more physical network infrastructure devices from one or more first location in the building to one or more second location in the building.

In some embodiments, the one or more design recommendations for the building include adding one or more additional physical network infrastructure devices to one or more particular locations within the building.

In some embodiments, the one or more design recommendations for the building include one or more network configurations for devices of the physical network infrastructure.

In some embodiments, the one or more design characteristics include a three dimensional design model of the building describing walls, windows, and areas of the building.

In some embodiments, the three dimensional design model of the building is a building information model (BIM).

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
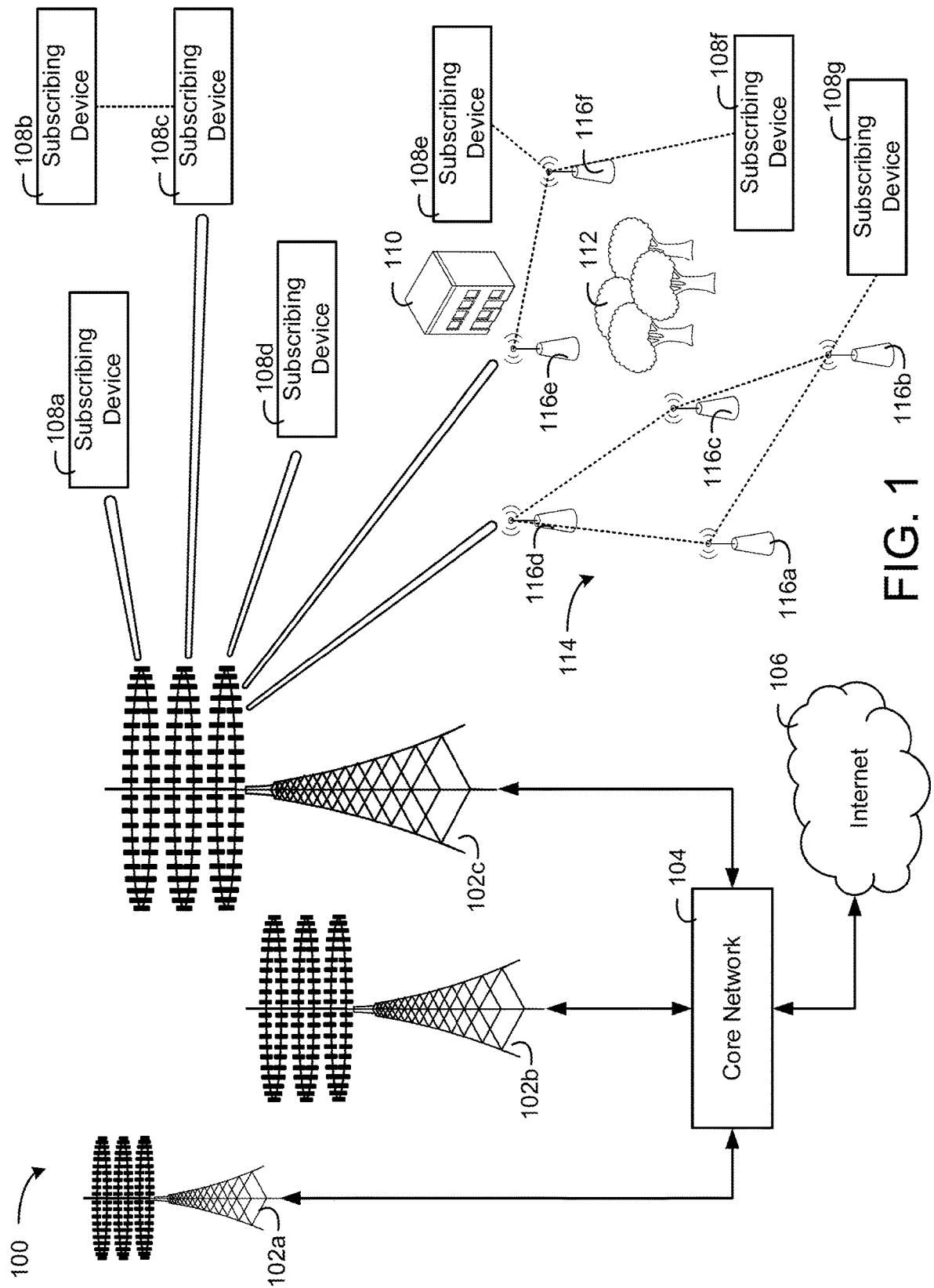
FIG. 1 is a 5G network where devices are configured to communicate via millimeter waves, according to an exemplary embodiment.

Referring now to FIG. 1, an illustration of a 5G network 100 including devices configured to communicate via millimeter waves, i.e., waves from 3 kHz to 300 GHz, according to an exemplary embodiment. In FIG. 1, multiple cellular towers 102a-102c each equipped with massive multiple input multiple output (MIMO) communication systems are shown. The cellular towers 102a-102c connect to a core network 104 configured to handle core network functions such as call routing, network bridging, voicemail, etc. The core network 104 connects the cellular towers 102a-102c to other networks such as the Internet 106. The massive MIMO communication systems of the cellular towers 102a-102c communicate to various subscribing devices 108a-108g. The subscribing devices 108a-108g may be cell phones, building equipment, laptop computers, tablet computers, etc. While various embodiments of the present disclosure are presented with reference to 5G technology, it should be understood that the presently described and claimed embodiments also encompass current and future technologies that include similar features as discussed herein with reference to 5G, and all such modifications are within the scope of the present disclosure.

The massive MIMO communication systems of the cellular towers 102a-102c is configured to communicate with the subscribing devices 108a-108g through beamforming. By transmitting a signal to a particular subscribing device through multiple different antennas at staggered time intervals, a directional beam can be formed directed to one of the subscribing devices 108a-108g. In addition to utilizing multiple antennas in transmission, the massive MIMO communication systems of the cellular towers 102a-102c can analyze received signals from subscribing devices 108a-108g through multiple receivers of the massive MIMO system. By analyzing the angle of arrival of a signal from the subscribing device, an angle of departure of a signal transmitted from a cellular tower to the subscribing device, and/or time of flight information, the cellular towers 102a-102c can locate the subscribing devices 108a-108g.

FIG. 1 further includes multiple obstacles, i.e., a building 110 and trees 112. Obstacles such as rain, buildings, trees, plants, mountains, buildings, etc. can obstruct the signals of the 5G network 100 of FIG. 1 since the waves are in a high frequency range, i.e., upwards of 300 GHz. Such high frequency millimeter waves can be absorbed by the obstacles and never reach a target device. To solve the obstacle problem, the 5G network 100 can include a small cell network 114. The small cell network 114 can include multiple low power repeater nodes 116a-116f that coordinate signals around the obstacles.

Figure 2:
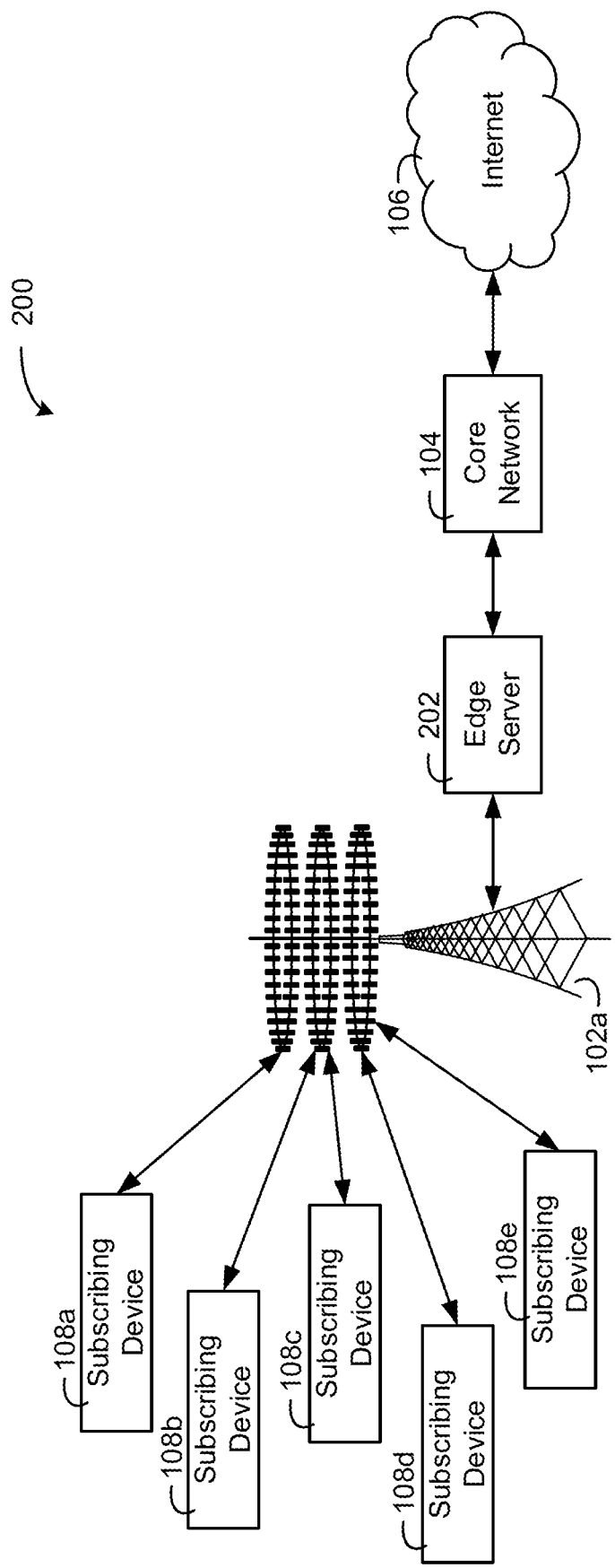
FIG. 2 is a 5G mobile edge computing system where an edge server is located close to the subscribing devices of the 5G network, according to an exemplary embodiment.

Referring now to FIG. 2, a 5G mobile edge computing system 200 is shown where an edge server 202 is located close to the subscribing devices 108a-108e of the 5G network 100, according to an exemplary embodiment. A network hop from a subscribing device of the subscribing devices 108a-108e to the core network 104 may be very fast due to the bandwidth and radio frequencies used in the 5G network. However, a network hop from the subscribing device to an Internet network server through the Internet 106 may be much longer since moving information between the subscribing device and the Internet 106 may require multiple network hops between servers, transmission over Internet cables, transmission through various domain name system (DNS) services, etc. This may result in latency that negates the speed advantages of the 5G radio communication network 100. To address the network hops, the system 200 of FIG. 2 can include an edge server 202 configured to provide local computing close to the subscribing devices 108a-108e such that services can be performed for the subscribing devices 108a-108e in near real-time.

Figure 3:
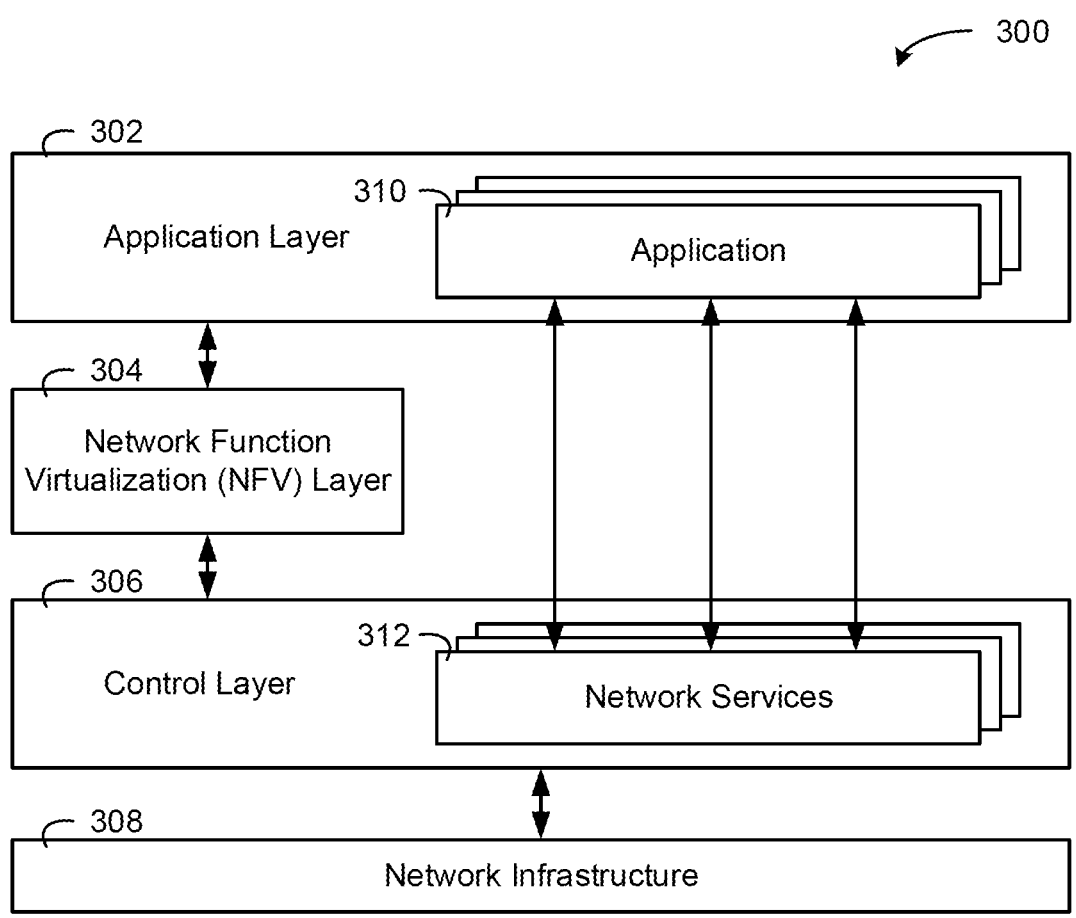
FIG. 3 is a system including network abstraction and virtualization through network function virtualization (NFV) and software defined networking (SDN), according to an exemplary embodiment.

Referring now to FIG. 3, a system 300 including network abstraction and virtualization through network function virtualization (NFV) and software defined networking (SDN) is shown, according to an exemplary embodiment. The system 300 of FIG. 3 includes an application layer 302, a NFV layer 304, a control layer 306, and a network infrastructure 308. The application layer 302 can include various applications 310, e.g., industry software applications that a developer may generate for providing content or other services to devices of the network infrastructure 308. The network infrastructure 308 includes the hardware of the network, i.e., routers, switches, repeaters, subscribing devices, cellular towers, small cell network nodes, etc. The network infrastructure 308 may facilitate packet forwarding such that information can be routed through the network infrastructure from one device to another.

The control layer 306 may facilitate SDN through abstraction of routing from the network infrastructure to the control layer. In this regard, rather than relying on the network infrastructure 308 itself to route packets through the network, the control layer can act as a controller for controlling how the network infrastructure 308 routes the packets. This allows for dynamic and user defined (or system defined) routing which can be implemented through various network services 312 that run in the control plane. The NFV layer 304 can virtualize all network functions (or some network functions) of the network infrastructure 308 under a hypervisor (e.g., virtual machine monitor (VMM)) allowing a network to expand in its functionality without requiring additions of new hardware into the network infrastructure 308. In some cases, the NFV layer 304 provides network functions for control and orchestration by the control layer 306. Examples of NFV functions may be load balancing, firewalls, security protocols, etc.

Figure 4:
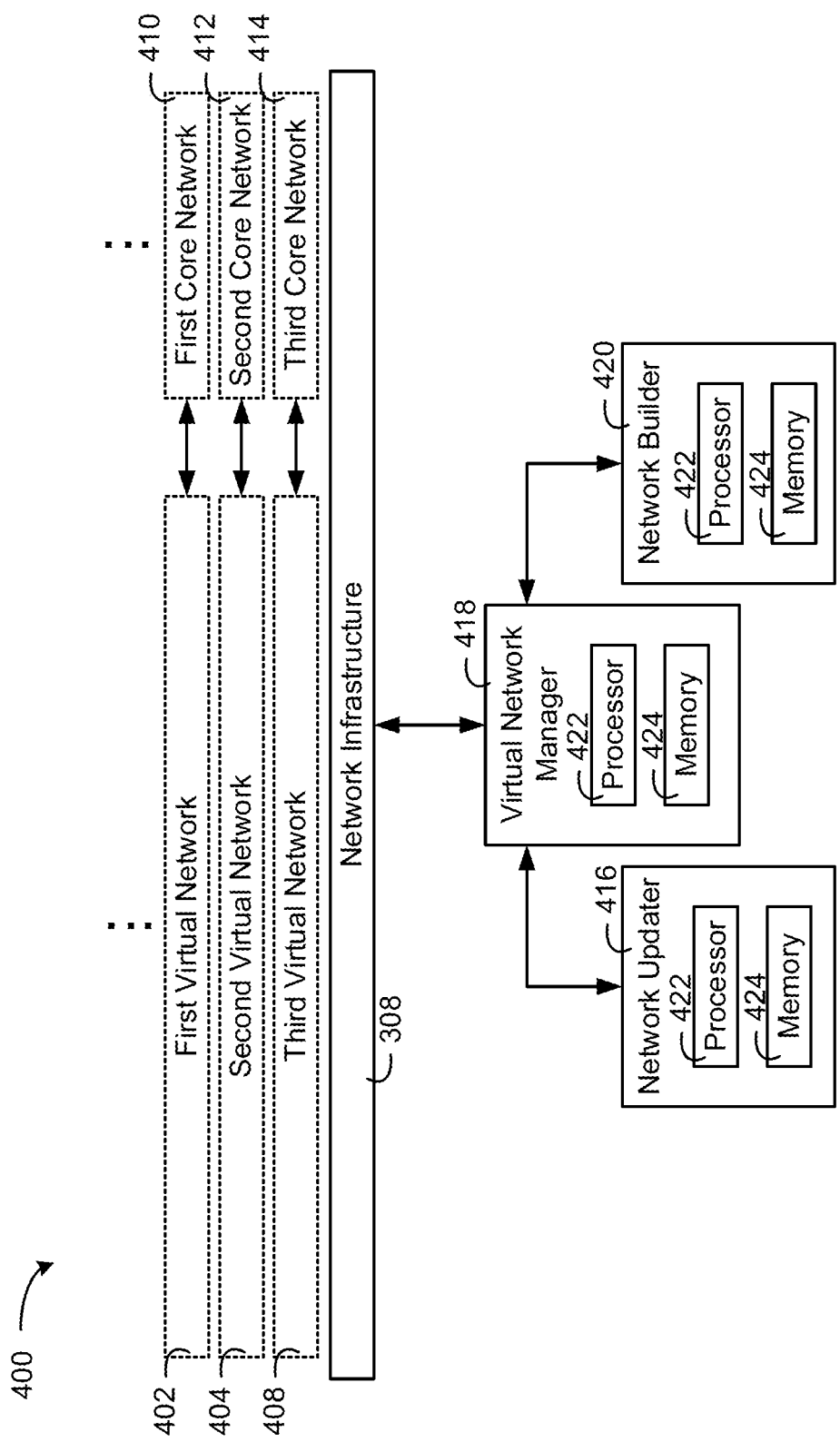
FIG. 4 is a system configured to implement network virtualization, according to an exemplary embodiment.

Referring now to FIG. 4, a system 400 configured to implement network virtualization is shown, according to an exemplary embodiment. The network virtualization of the system 400 of FIG. 4 may be implemented through NFV and/or SDN as illustrated in FIG. 3. The network infrastructure 308 can be controlled through NFV and/or SDN to implement multiple virtual networks 402-408 and/or virtual core networks 410-414 for each virtual network. Each of the networks 402-408 can include specific methods of packet forwarding, specific uplink allocations, specific downlink allocations, security protocols, permissions, etc. The virtual network manager 418 can generate the virtual networks 402-408 and operate the network infrastructure 308 through SDN and/or NFV to implement the various virtual networks 402-408.

The virtual network manager 418 can communicate with a network builder 420 and a network updater 416. The network builder 420 can collect and/or receive information about the network infrastructure 308 and/or user requirements for generating a virtual network (e.g., from a user device), e.g., what network allocations each virtual network should have, how many virtual networks should be built, what special security and/or network functions should exist in each network, etc. The network builder 420 can generate a virtual description of a virtual network for implementation by the virtual network manager 418 via the network infrastructure 308. The network updater 416 can be configured to collect and/or receive information indicating that the operation of one of the virtual networks 402-408 should change. For example, changes in network allocation may be triggered by the network updater 416. Based on the updates to the virtual networks identified by the network updater 416, the virtual network manager can adjust the configuration of the virtual networks 402-408 and/or core networks 410-414.

The virtual network manager 418, the network updater 416, and the network builder 420 can be implemented on one or multiple different computing devices, e.g., with one or more of a processor 422 and/or one or more of a memory device, memory 424. These computing devices including the processor 422 and the memory 424 can be located on-premises in a building or off-premises in a cloud. In some cases, the computing devices can be implemented as a hybrid of on-premises and off-premises devices or implemented edge server 202 of FIG. 2.

The processor 422 can be a general purpose or specific purpose processor, an application specific integrated circuit (ASIC), one or more field programmable gate arrays (FPGAs), a group of processing components, or other suitable processing components. The processor 422 may be configured to execute computer code and/or instructions stored in the memories or received from other computer readable media (e.g., CDROM, network storage, a remote server, etc.).

The memory 424 can include one or more devices (e.g., memory units, memory devices, storage devices, etc.) for storing data and/or computer code for completing and/or facilitating the various processes described in the present disclosure. The memory 424 can include random access memory (RAM), read-only memory (ROM), hard drive storage, temporary storage, non-volatile memory, flash memory, optical memory, or any other suitable memory for storing software objects and/or computer instructions. The memory 424 can include database components, object code components, script components, or any other type of information structure for supporting the various activities and information structures described in the present disclosure. The memory 424 can be communicably connected to the processors and can include computer code for executing (e.g., by the processors) one or more processes described herein.

Figure 5:
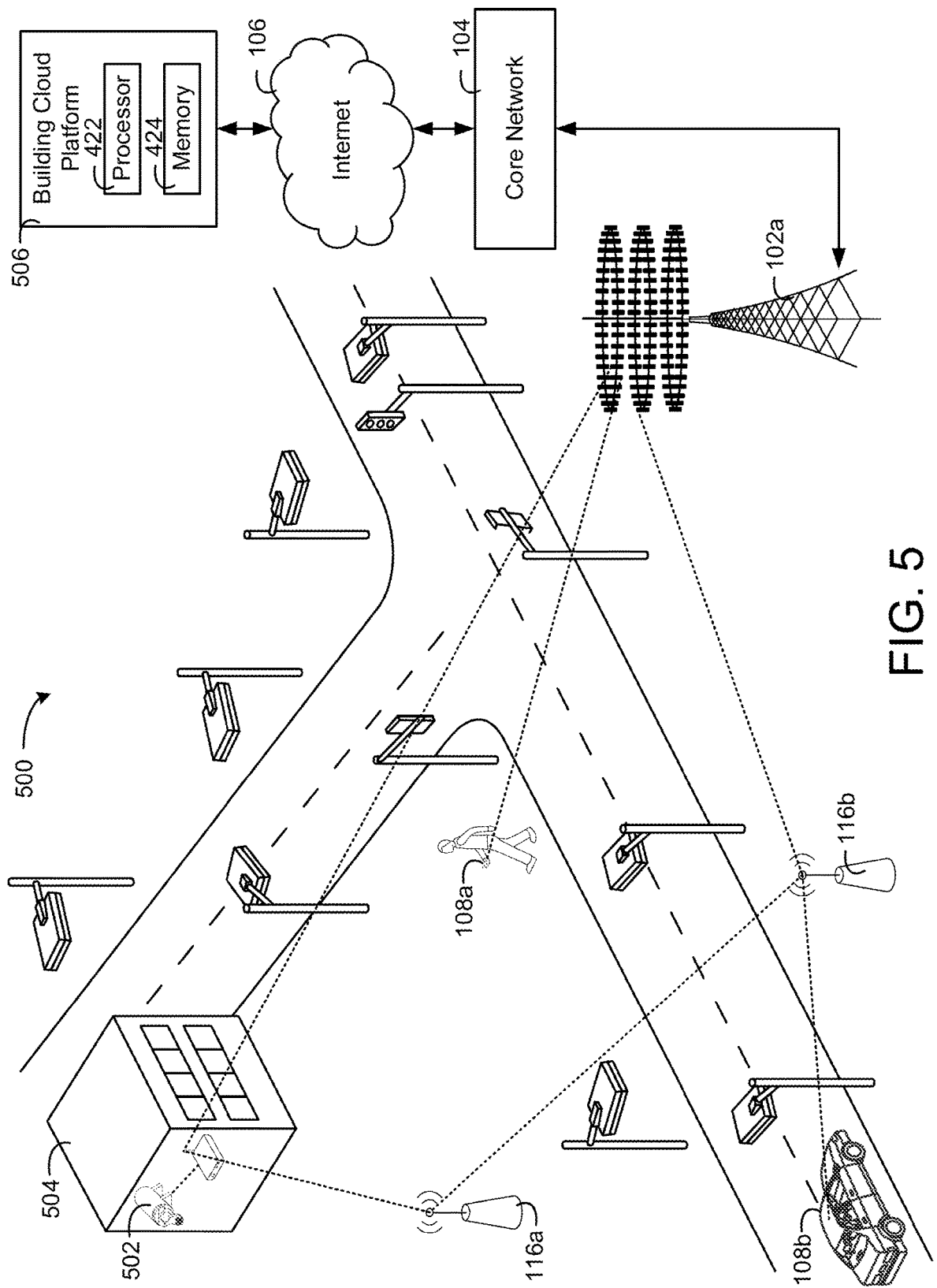
FIG. 5 is a system including a 5G network connection to a building, according to an exemplary embodiment.

Referring now to FIG. 5, a system 500 illustrating a 5G network connection to a building 504 is shown, according to an exemplary embodiment. In the system 500 of FIG. 5, a building device 502 communicates with both the cellular tower 102a and the small cell network 114 including the nodes 116a and 116b outside the building 504. The building device 502 operates building equipment, in some embodiments, to control environmental conditions of the building 504 within which the building device is located. The building device 502 may be connected to outside networks through the core network 104. For example, the building device 502 can communicate with a building cloud platform 506 through the Internet 106 and the core network 104.

Figure 6:
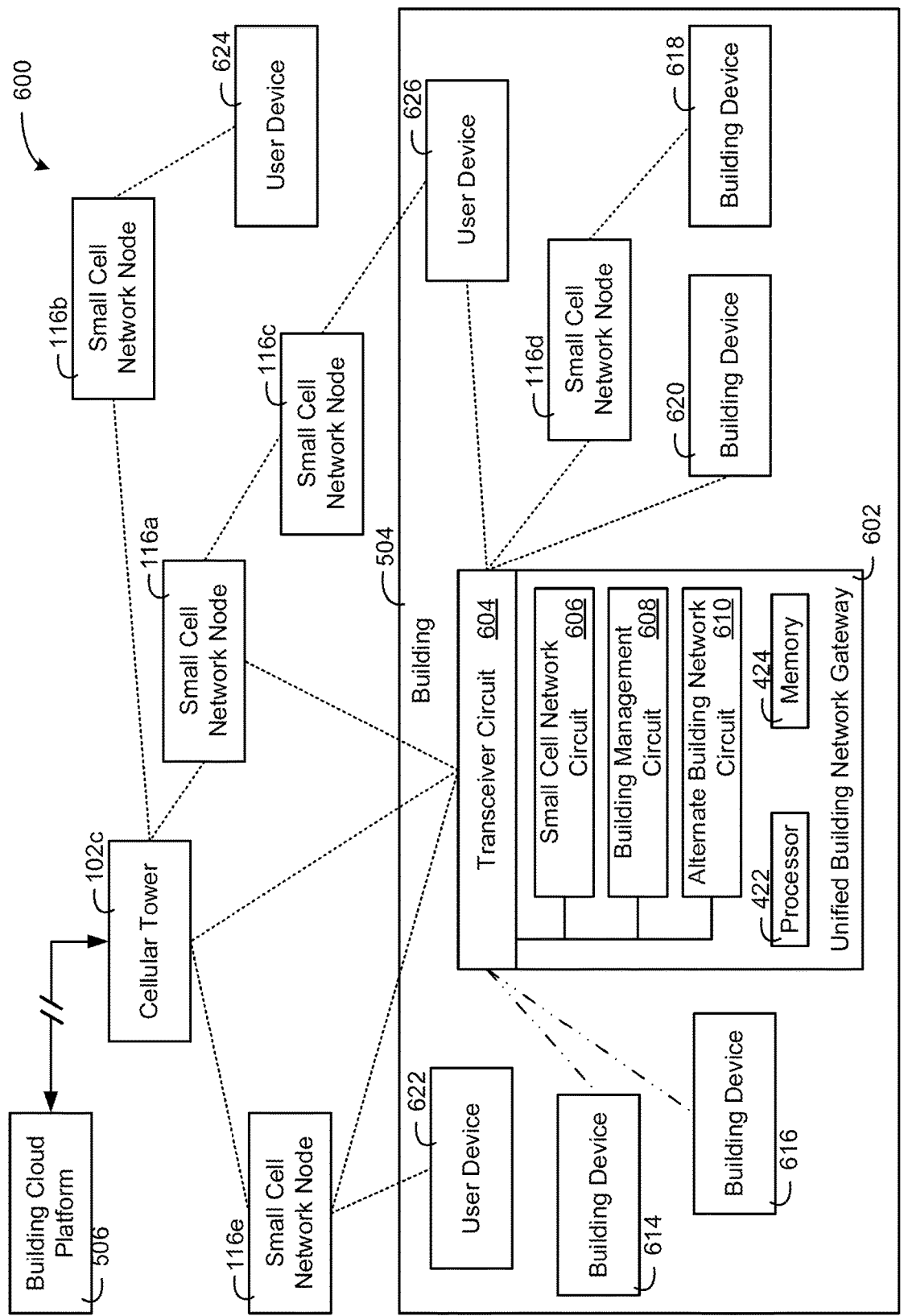
FIG. 6 is a system including a unified building network gateway, according to an exemplary embodiment.

Referring now to FIG. 6, a system 600 including a unified building network gateway 602 is shown, according to an exemplary embodiment. The gateway 602 can include a transceiver circuit 604 for communication with devices of the 5G network and other devices of non-5G networks, for example, Zigbee, RS-485, etc. Furthermore, the building network gateway 602 can facilitate 5G communication through the building 504 to other 5G communicating pieces of building equipment (e.g., a building device 612, a building device 614, etc.). The gateway 602 can connect to the building cloud platform 506 through either the cellular tower 102c or alternatively nodes 116a-116e of the small cell network 114. The system 600 further includes user devices 622, 624 and 626 which may be subscribing devices described with reference to FIG. 1.

In some embodiments, the gateway 602 can act as a data collection system that aggregates data collected over 5G and non-5G networks within the building and communicates the collected data to the building cloud platform via the 5G network. Furthermore, in some embodiments, the gateway 602 can facilitate control functionality, i.e., determine control decisions via a building management circuit 608 based on the collected data and communicate control operations to the building equipment via the 5G network (e.g., a building device 618 and/or 620) and/or the non-5G network (e.g., building device 614 and/or 616).

The unified building network gateway 602 can include a small cell network circuit 606. The small cell network circuit 606 can be configured to cause the unified building network gateway 602 to communicate with other building devices (e.g., a building device 618, building device 620) and/or small cell network nodes 116a-116d via a 5G network. In some embodiments, the small cell network circuit 606 causes the unified building network gateway 602 to act as a small cell network node for the 5G network.

The unified building network gateway 602 includes the building management circuit 608. The building management circuit 608 can be configured to facilitate control decisions, data aggregation, fault detection, and/or any other building management functionalities. The unified building network gateway 602 includes an alternate building network circuit 610. The alternate building network circuit 610 can be configured to facilitate communication with the building devices 614 and 616 via a building network that is not 5G. For example, the building network may be Wi-Fi, Zigbee, Zwave, etc. Details of a building gateway are included in U.S. patent application Ser. No. 15/494,403 filed Apr. 21, 2017, the entirety of which is incorporated by reference herein.

Figure 7:
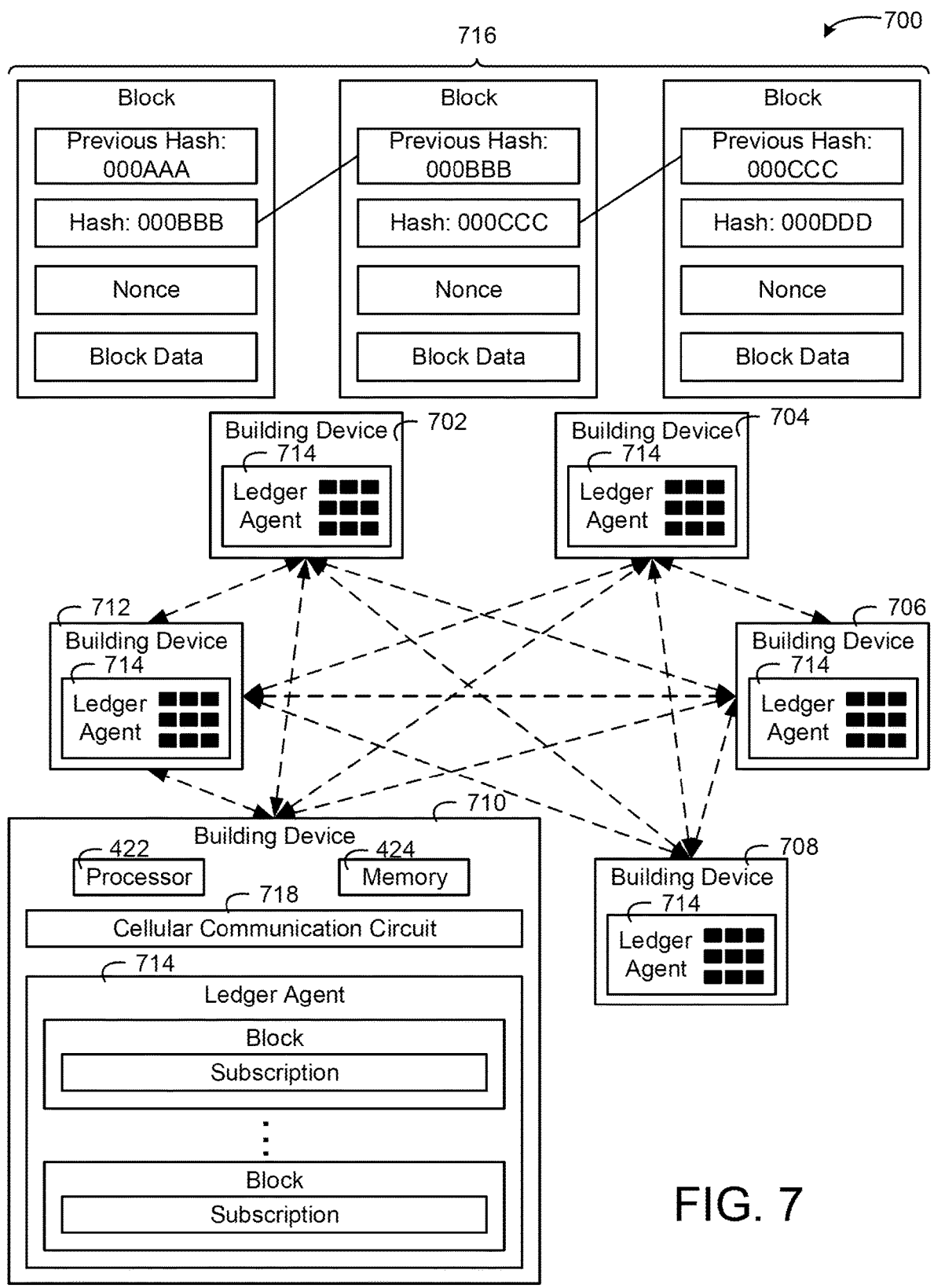
FIG. 7 is a system of building devices communicating via a 5G network and implementing a distributed ledger, according to an exemplary embodiment.

Referring now to FIG. 7, a system 700 of building devices communicating via a 5G network and implementing a distributed ledger is shown, according to an exemplary embodiment. The building devices 702-712 of the system 700 of FIG. 7 each include a ledger agent 714, a cognitive machine learning based agent configured to implement logical operations to maintain a distributed ledger (e.g., blockchain) and utilize the distributed ledger for authentication, subscription authorization, device isolation, etc. The ledger agents 714 of the building devices 702-712 can communicate with each other to manage a ledger 716. For example, the ledger agents 714 can generate new blocks for the ledger 716 and also solve hash values for the new blocks allowing for the new blocks to be added to the ledger. The building devices 702-708 can include a cellular communication circuit 718 configured to communicate with the other devices 702-708 via a 5G network.

The ledger 716 maintained by the agents 714 can include block data indicative of various permissions and/or features assigned to each of the building devices 702-712. The block data can include subscription information indicating which devices are authenticated to run various pieces of software. The blocks may indicate that a particular building device has a subscription to a piece of software. The ledger agent 714 of the particular building device can utilize the subscription recorded in the ledger to authenticate a piece of software run by the particular building device.

The ledger 716 can include block data (e.g., metadata describing the building devices, subscriptions of the building devices, authorizations of the building devices, etc.). The blocks may further include a previous hash. The previous hash may be a hash of a previous block in the ledger 716. Furthermore, the block may include a nonce value. The nonce, when hashed with the block data and the previous hash, may result in a hash that meets a predefined requirement. For example, the requirement may be that the first three characters of the resulting hash are zero. Details of blockchain are included in U.S. patent application Ser. No. 15/592,041 filed May 10, 2017, the entirety of which is incorporated by reference herein.

Figure 8:
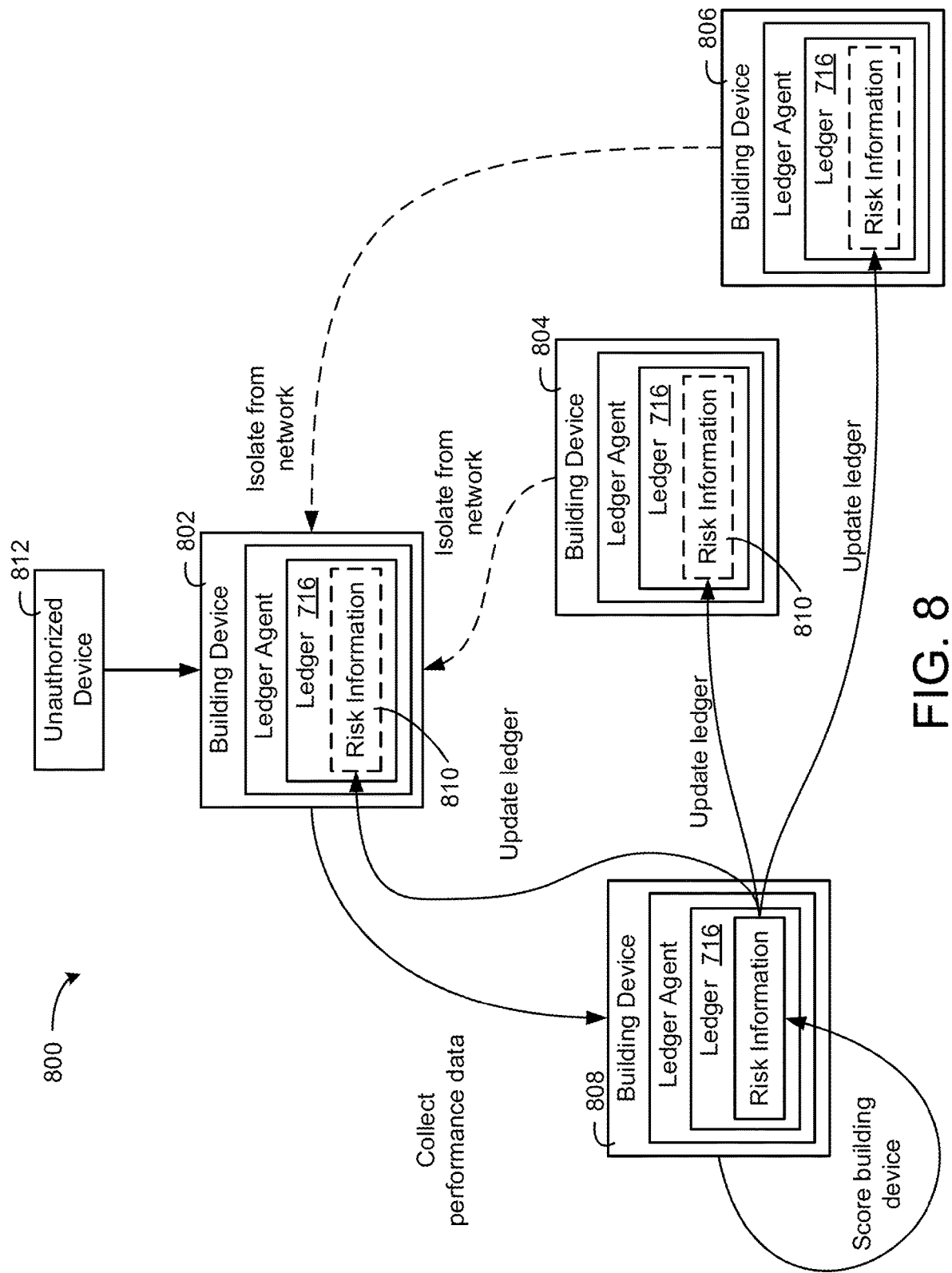
FIG. 8 is a system of building devices implementing a distributed ledger including risk information for the building devices, according to an exemplary embodiment.

Referring now to FIG. 8, a system 800 of building devices 802-808 implementing the distributed ledger 716 including risk information for the building devices 802-808 is shown, according to an exemplary embodiment. The system 800 includes multiple building devices 802-808 which may be the same as or similar to the building devices described elsewhere herein, e.g., as described with reference to FIGS. 1-6. The building devices 802-808 can collect performance data from each other and generate the ledger 716. The ledger 716 can be distributed across the network of the building devices 802-808. For example, one building device 808 may generate and/or update the ledger 716 based on building performance data collected from another building device 802 of the building devices 802-808.

With the new and/or updated ledger 716, the building device 808 can send the updated ledger 716 to other building devices, e.g., the building device 802, the building device 804, and the building device 806. In some embodiments, a remote server or other system can aggregate performance data of all of the building devices 802-808, generate the ledger 716 based on the performance data, and/or distribute the ledger 716 to all of the building devices 802-808.

In some embodiments, the ledger 716 includes metadata identifying all of the building devices 802-808 of the network and performance characteristics (e.g., how many times the building device has gone offline, has receive an invalid login credential, has crashed, a network reliability indication, etc.). In some embodiments, the ledger 716 is a block chain based ledger, e.g., similar to or the same as the blockchain ledger described with reference to FIG. 7. In some embodiments, the ledger 716 is not blockchain and is a metadata file.

The ledger 716 can include and/or can be used to generate risk information 810. For example, a risk score can be generated by one building device 808 for another building device based on collected performance data of the other building device 802 and/or performance data included within the ledger 716. For example, the score may indicate how likely the building device 802 is to being compromised by a hacker or other unauthorized user (e.g., the unauthorized device 812). In this regard, the ledger 716 can indicate the building device 802 is being accessed by an unauthorized device. Each of the building devices 802-808 can isolate (e.g., stop communicating with) the compromised building device 812 to stop the unauthorized user from compromising other building devices in the network.

Figure 9:
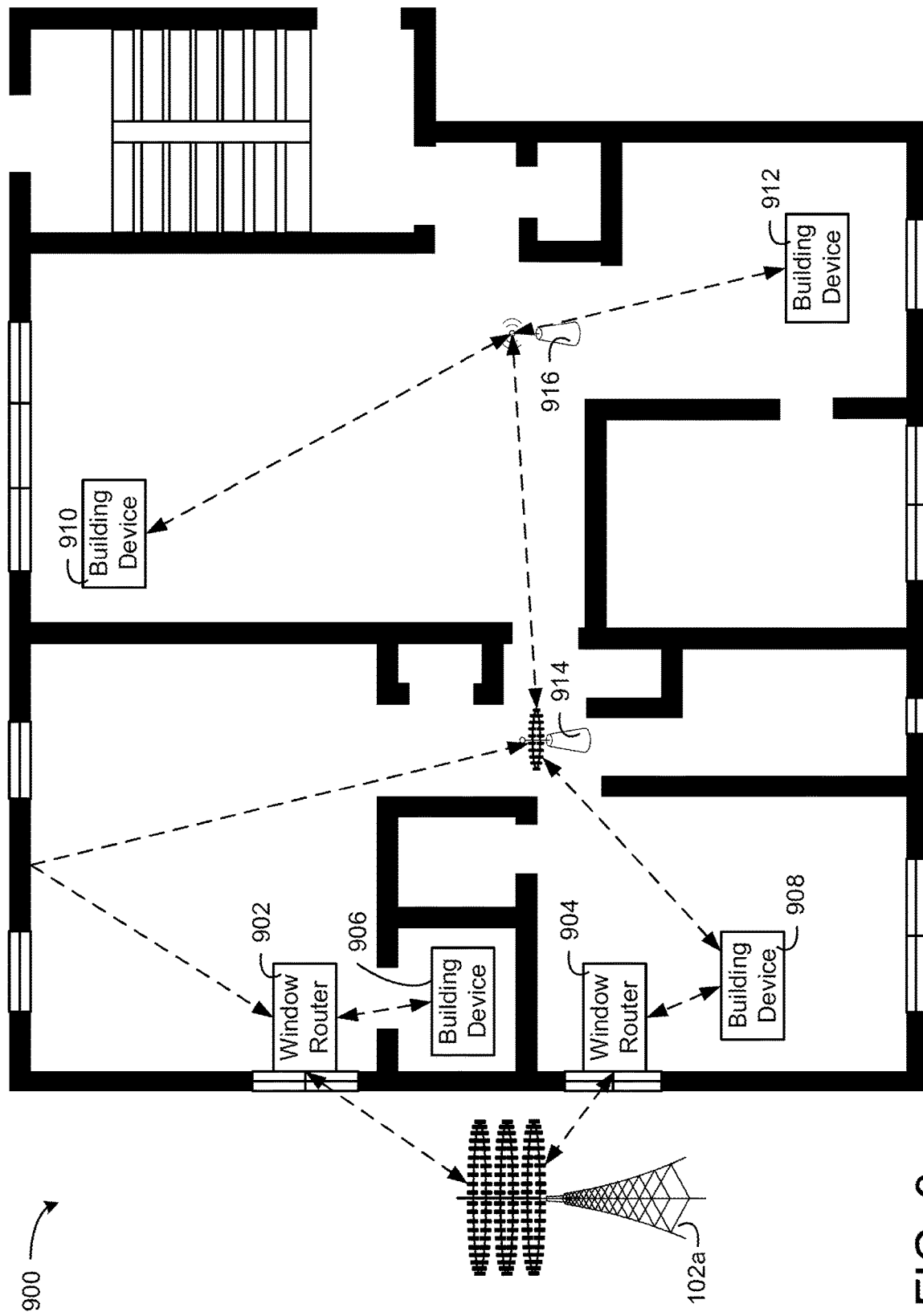
FIG. 9 is an exemplary floor of a building illustrating the 5G network both within and outside the building, according to an exemplary embodiment.

Referring now to FIG. 9, an exemplary floor 900 of a building illustrating the 5G network 100 both within and outside the building is shown, according to an exemplary embodiment. The cellular tower 102*a* communicates with window routers 902 and 904, devices positioned near or on windows to increase the line of sight connection to the cellular tower 102*a* and avoid absorption or reflection of the 5G signals by the walls of the building. Various building devices 906-912 may communicate directly with the window routers 902-904. Furthermore, nodes 914 and 916 of a small cell network are positioned within the building to provide a line of sight down hallways and into various rooms of the building to connect the various building devices 908-912 to the 5G network.

One of the small cell network nodes, node 914, includes a phased array. In this regard, the small cell network can direct transmitted signals of the 5G network directly to a receiving device. Furthermore, the phased array can be configured to bounce the 5G signal off a wall or other object to reach a receiving device (e.g., the window router 902 or another device of the building) that is not within a line of sight of the phased array.

Figure 10:
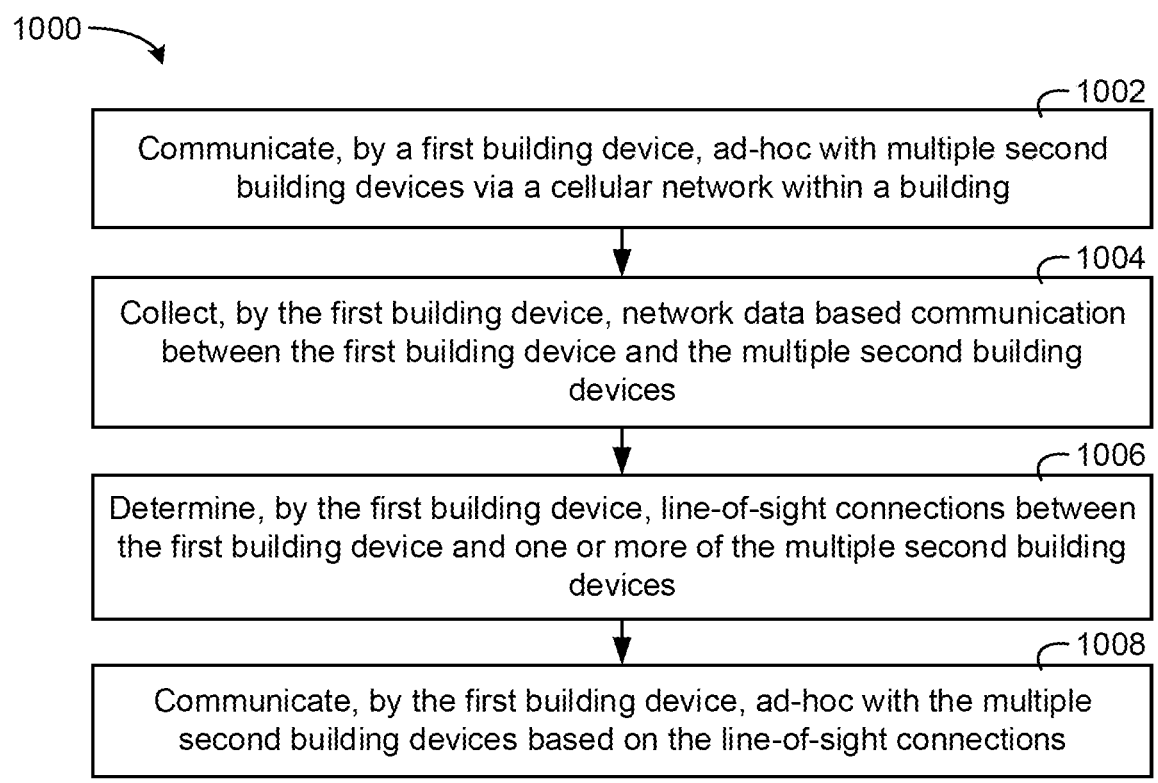
FIG. 10 is a flow diagram of a process of determining line-of-sight connections for a building device, according to an exemplary embodiment.

Referring now to FIG. 10, a flow diagram of a process 1000 of determining line-of-sight connections for a building device is shown, according to an exemplary embodiment. The process 1000 is described with reference to building devices of a building that communicate via a 5G network. The building devices and the 5G network discussed with reference to the process 1000 may be the same as the devices and networks described with reference to FIGS. 1-9. The process 1000 can be implemented by the processors and memory devices described herein.

The first building device communicates ad-hoc with multiple second building devices via a cellular network within a building (step 1002). The communications may be 5G communications and may be performed directly between each of the multiple second building devices and the first building device. The first building device can collect network data based on each communication (step 1004). For example, the first building device can receive response time indications, signal strength indications, no response, etc. This information may be indicative of the existence of a direct line-of-sight connection between the first building device and each of the multiple second building devices.

The first building device can determine one or more line-of-sight connections between the first building device and one or more of the multiple second building devices based on the collected network data (step 1006). By establishing one or more line-of-sight connections, the first building device can establish ideal pathways for communicating information. For example, the line-of-sight connections may be indicative of the most reliable communication paths and the first building device can utilize these communication paths when communicating information via the 5G network (step 1008).

Figure 11:
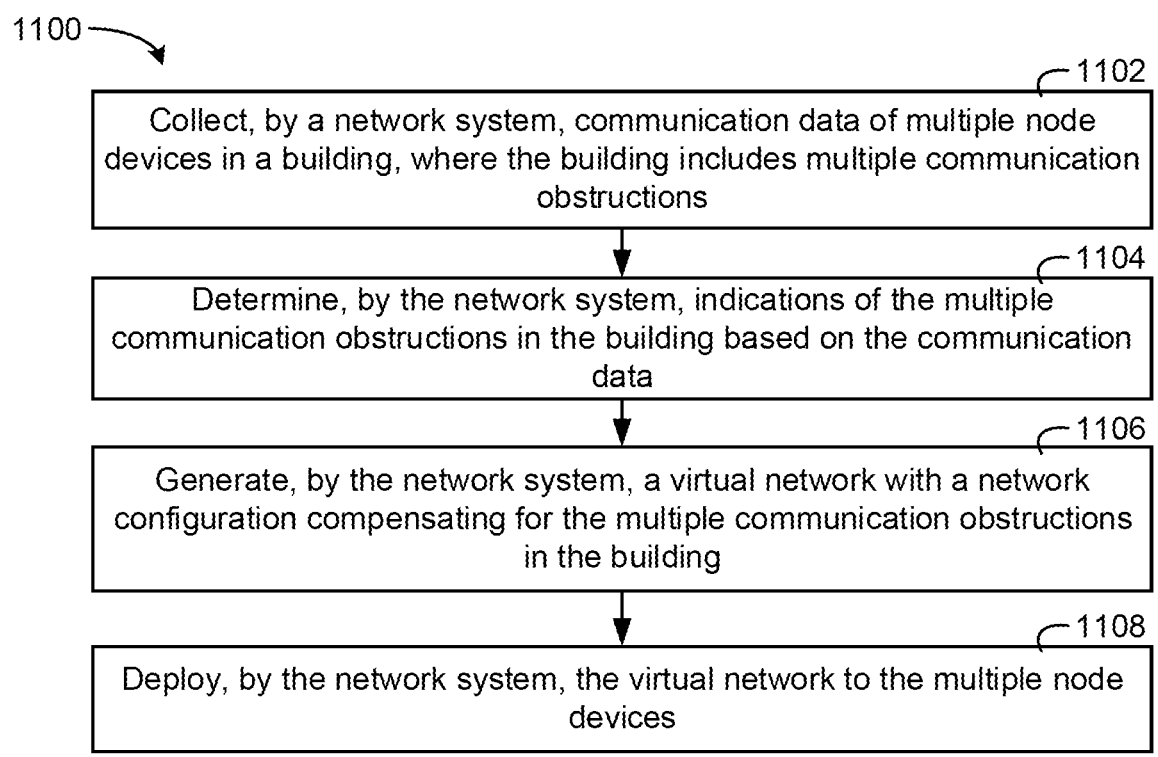
FIG. 11 is a flow diagram of a process of configuring virtual networks to compensate for obstructions in a 5G network, according to an exemplary embodiment.

Referring now to FIG. 11, a flow diagram of a process 1100 of configuring virtual networks to compensate for obstructions in a 5G network is shown, according to an exemplary embodiment. The process 1100 is described with reference to building devices of a building that communicate via a 5G network and virtual networks. The building devices, the 5G network, and the virtual networks discussed with reference to the process 1100 may be the same as the devices and networks described with reference to FIGS. 1-9. The process 1100 can be implemented by the processors and memory devices described herein.

The virtual network can utilize SDN and/or NFV to implement a virtual network within a building that routes packets effectively through the building network to avoid physical obstructions. A network system collects communication data of multiple node devices within a building (step 1102). The multiple node devices may be thermostat, sensors, controllers, user cell phones, repeaters, small cell network nodes, etc. The building may have multiple physical obstructions that make communication of millimeter wave signals to be communicated. Such obstructions may absorb the signals.

The network system can determine indications of the multiple communication obstructions based on the communication data (step 1104). The indications may be direct indications, i.e., two devices are separated by a physical obstruction even though the devices are in close proximity. The network system can determine the indications of the communications obstructions by analyze communication paths, analyzing signal strengths, etc.

Once the indications of the communication obstructions are determined, the network system can utilize the obstructions to generate or update a virtual network (step 1106). The network system can update configuration data to utilize particular routing paths through a building, utilize certain data compression for network nodes that are highly obstructed, or otherwise configure the virtual network to address the physical obstructions. With the network configuration, the network system can deploy the virtual network by causing the multiple node devices to implement the virtual network (step 1108).

Figure 12:
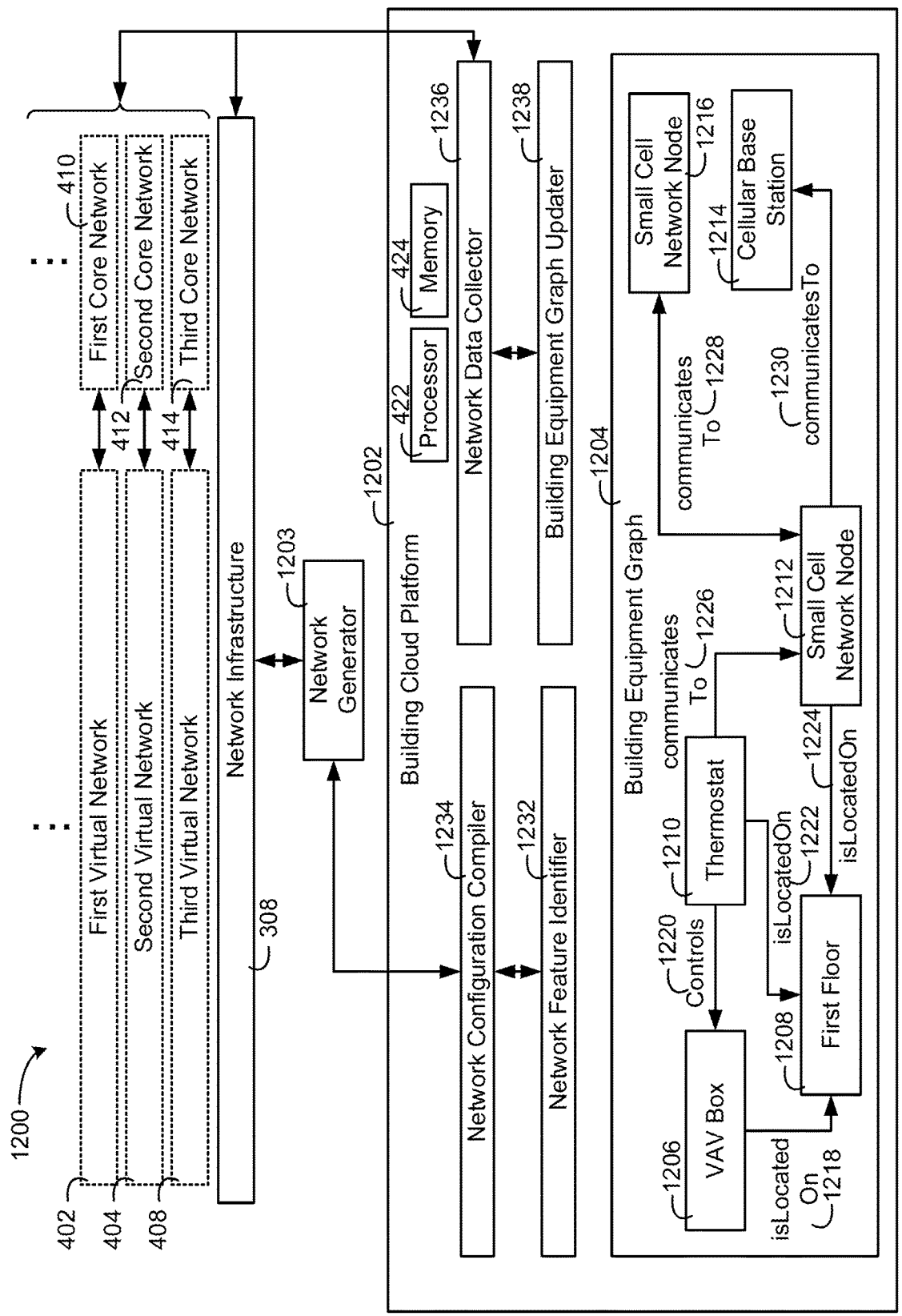
FIG. 12 is a system with a building cloud platform configured to generate network configurations for implementing virtual networks in a building, according to an exemplary embodiment.

Referring now to FIG. 12, a system 1200 including a building cloud platform 1202 that generates network configurations for implementing virtual networks in a building is shown, according to an exemplary embodiment. The building cloud platform 1202 can generate the network configuration while the network generator 1203 can cause the network infrastructure 308 to implement the virtual networks 402-408. The virtual networks 402-408 created by the building cloud platform 1202 can each exist within the same building and serve various equipment groups within the building. For example, an HVAC virtual network for serving HVAC devices, a surveillance network for serving surveillance devices, or a fire detection and response network for serving fire detection and response devices can exist.

As each network is virtual, the data routing and/or network functions of each network may be specific to the devices that the virtual network serves. For example, the surveillance network may implement a particular form of data encryption to secure video feeds communicated on the virtual network. Furthermore, the HVAC network may have high uplink capabilities and lower downlink capabilities to allow the HVAC network to collect and report timeseries data but also include enough bandwidth for periodic control commands to be communicated via the network.

In some cases, the building cloud platform 1202 may define the configurations of each virtual network based on information collected via existing networks and/or the network infrastructure 308. The building cloud platform 1202 includes a network feature identifier 1232 which defines features for a virtual network (e.g., what devices, uplink bandwidth, downlink bandwidth, active times, firewalls, etc.) for a virtual network. The building cloud platform 1202 includes a network configuration compiler 1234 which takes the features identified by the network feature identifier 1232 and compiles a virtual network configuration that the network generator 1203 uses to generate one of the virtual networks 402-408.

For example, the building cloud platform 1202 might identify that the number of surveillance cameras has increased from two to forty based on data communicated over the network. The high number of new surveillance cameras may cause the building cloud platform to configure a new virtual network for the surveillance cameras.

Furthermore, in some cases, the building cloud platform 1202 may store a building equipment graph 1204. The graph 1204 may be a graph with edges 1218-1230 and nodes 1206-1216, the nodes 1206-1216 representing equipment of the building and the edges 1218-1230 representing relationships between the nodes 1206-1216. The building cloud platform 1202 can identify, based on the building equipment graph 1204, one or multiple virtual networks to deploy. The building cloud platform 1202 includes a network data collector 1236 that collects data from devices of the virtual networks 402-408. A building equipment graph updater 1238 can take the collected data and update the building equipment graph 1204 based on the collected data.

The graph 1204 includes nodes 1206-1216 for a VAV box, a thermostat, a first floor of a building, a small cell network node, another small cell network node, and a cellular base station. The graph 1204 includes edges 1218-1230 between the various nodes 1206-1216. A "controls" edge 1220 indicates that the thermostat controls the VAV box. An "isLocatedOn" edge 1222 indicates that the thermostat is located on the first floor. A "communicatesTo" edge 1226 indicates that the thermostat communicates to the small cell network node 1212. An "isLocatedOn" edge 1222 indicates that the VAV box is located on the first floor of the building. An "isLocatedOn" edge 1224 indicates that the small cell network node is located on the first floor of the building. A "communicatesTo" edge 1228 indicates that the small cell network nodes communicate with each other. A "communicatesTo" edge 1230 indicates that the small cell network node communicates to the cellular base station.

In addition to deploying the virtual networks 402-408, the building cloud platform 1202 can cause the virtual networks 402-408 to dynamically change over time to efficiently prioritize building network resources. For example, cellular traffic in the building may change over time, i.e., be highest between 8 A.M. and 5 P.M. In this regard, the building cloud platform 1202 can cause a virtual network for user traffic to change throughout a day. Similarly, a facial recognition system for frictionless access control to a building may be high around 8 A.M. and 5 P.M. during the day but significantly lower at other points in the day. Similar adjustments to the network allocations of the surveillance system to facilitate the high resource demanding times.

Another example of network allocation changes may be new equipment. As new HVAC equipment is added to a building, the network allocation of a virtual network for HVAC equipment may need to be adjusted. Similarly network allocation to the HVAC equipment virtual network could be reduced if the number of devices in the network is reduced over time.

Figure 13:
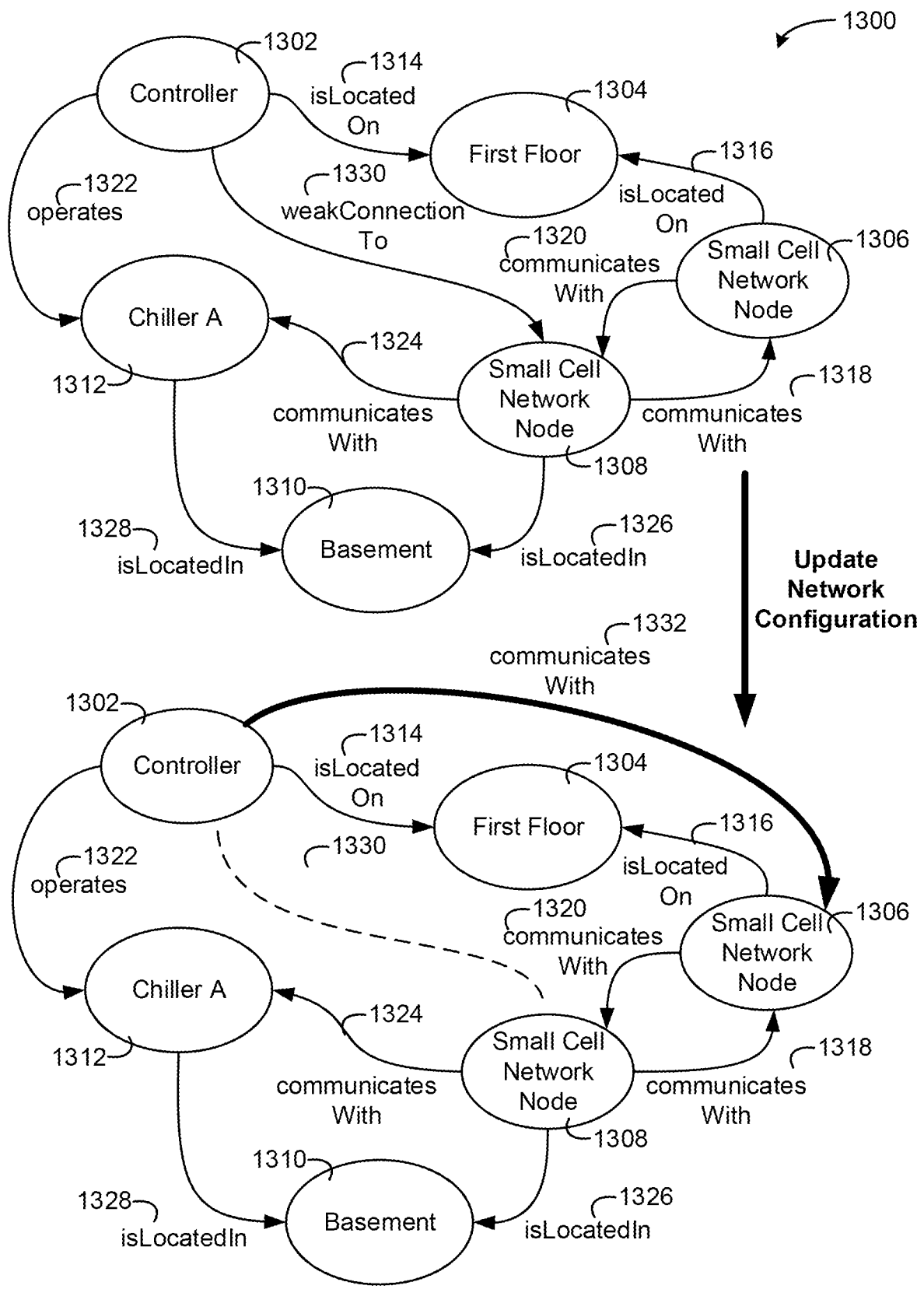
FIG. 13 is a block diagram of a building network graph being updated by the building cloud platform of FIG. 12, according to an exemplary embodiment.

Referring now to FIG. 13, a building network graph 1300 being updated by the building equipment graph updater 1238 is shown, according to an exemplary embodiment. The updater 1238 can be configured to update the building graph 1300 by adding and/or removing nodes to/from the building graph 1300. The updater 1238 can be configured to update the building graph 1300 by adding and/or removing edges of the building graph 1300. The first version of the building graph 1300, indicating the building graph 1300 at a first point in time, has multiple nodes 1302-1312 and multiple edges 1314-1330. The nodes 1302-1312 represent network devices of the building. The network devices include a controller, a chiller A, and two small cell network nodes. The nodes 1302-1312 can include people, events, and spaces. For example, the nodes 1302-1312 include a first floor node and a basement.

The edges 1314-1330 represent relationships between the nodes 1302-1312. For example, the "isLocatedOn" edge 1314 indicates that the controller is located on the first floor. The "operates" edge 1322 indicates that the controller operates the chiller A. The "weakConnectionTo" edge 1330 indicates that the controller has a weak network connection to the small cell network node. The "isLocatedIn" edge 1328 indicates that the chiller A is located in the basement. The "communicatesWith" edge 1324 indicates that the small cell network node 1308 communicates with the chiller A. The "communicatesWith" edge 1320 and the other "communicatesWith" edge 1318 indicates that the small cell network nodes 1306 and 1308 communicate with each other. Furthermore, the "isLocatedOn" edge 1316 indicates that the small cell network node 1306 is located on the first floor.

The updater 1238 can analyze the first version of the building graph 1300 and update the first version of the building graph 1300 to the second version of the building graph 1300 by removing the "weakConnectionTo" edge 1330 between the controller and the small cell network node 1308 and adding the "communicatesWith" edge 1332 between the controller and the small cell network node 1306. Devices of a network can be configured to communicate and/or operate according to the relationships of the building graph 1300. In this regard, at a first point in time when the first version of the building graph 1300 is being implemented, the controller can communicate with the small cell network node 1308. However, since this communication connection is weak, the updater 1238 can remove the edge 1330 and add the "communicatesWith" edge 1332. Based on the "communicatesWith" edge 1332, the controller can communicate with the other small cell network node 1306 (e.g., the 1202 can update a virtual network to cause the controller to communicate with the other small cell network node).

Figure 14:
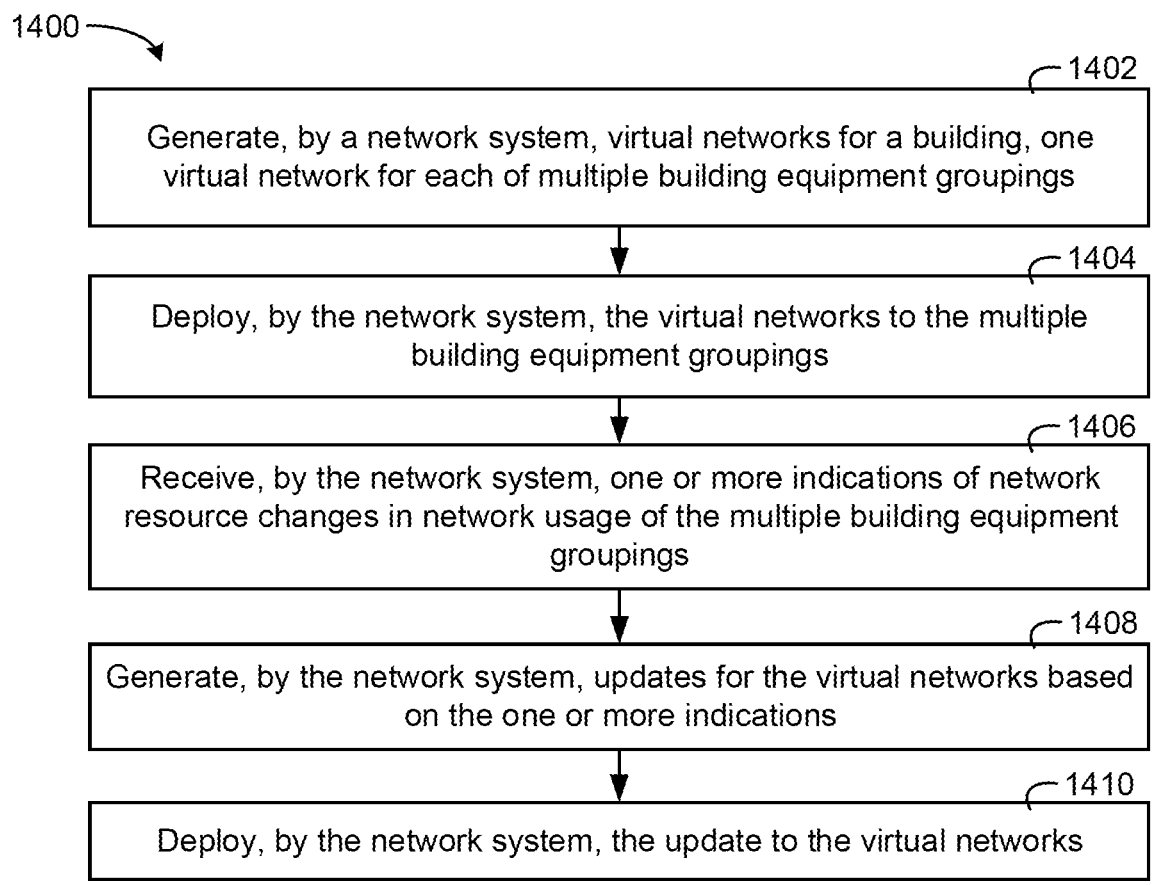
FIG. 14 is a flow diagram of a process of prioritizing network resources of a building through virtual networks, according to an exemplary embodiment.

Referring now to FIG. 14, a flow diagram of a process 1400 of prioritizing network resources of a building through virtual networks is shown, according to an exemplary embodiment. The process 1400 can be implemented by the processors and memory devices described herein. The building cloud platform 1202 generates the virtual networks 402-408 for a building (step 1402). The virtual networks 402-408 may be generated to serve various equipment groupings, i.e., one virtual network per equipment grouping. The equipment groupings may be a surveillance system group, an HVAC device group, a user personal device group, etc. The building cloud platform 1202 can deploy the virtual networks over the network infrastructure (step 1404).

The building cloud platform 1202 can receive indications of network resource changes to allocation for the virtual networks 402-408 (step 1406). The indications may indicate that certain groupings of equipment are using more or less bandwidth, the number of devices have changed, network utilization is predicted to change for a particular equipment group, etc. Based on the indications, the building cloud platform 1202 can update the virtual networks (step 1408) and subsequently deploy the updates to the virtual networks (step 1410).

Figure 15:
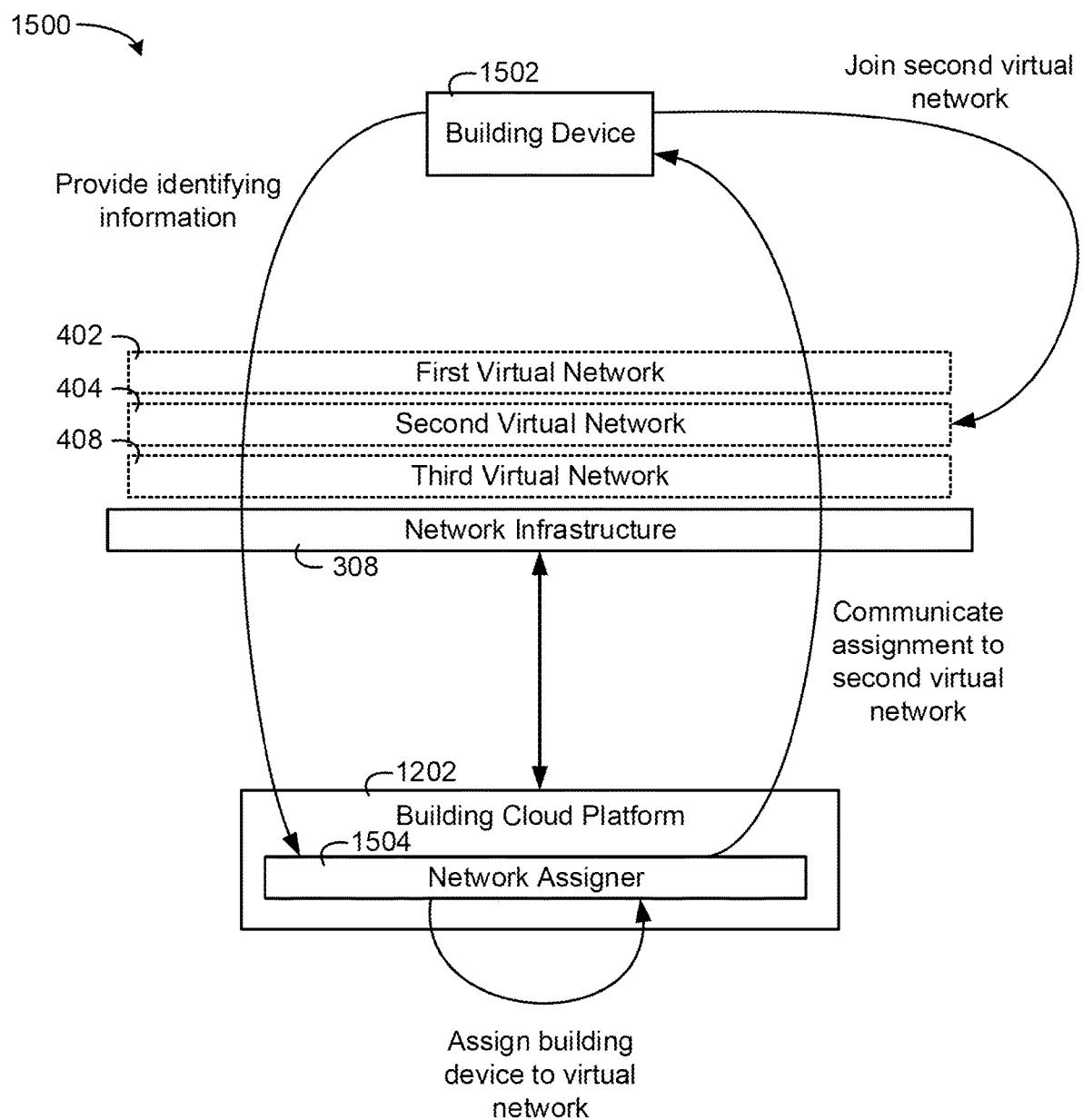
FIG. 15 is a system configured to add building devices to virtual networks, according to an exemplary embodiment.

Referring now to FIG. 15, a system 1500 configured to add building devices to virtual networks 402-408 is shown, according to an exemplary embodiment. The system 1500 includes a building device 1502. The building device 1502 may be the same as or similar to the building devices described with reference to FIGS. 1-14. The building device 1502 is shown to communicate via the network infrastructure and/or virtual networks run on the network infrastructure 308. The network infrastructure 308 and the virtual networks 402-408 are described in greater detail in FIGS. 4 and 12.

The building device is configured to communicate via the network infrastructure 308 e.g., via one of the virtual networks run on the network infrastructure 308. The building device 1502 may, when first booted up and/or connected to a virtual network and/or virtual networks of the network infrastructure 308, provide identifying information to the building cloud platform 1202. The identifying information can be metadata describing the building device, e.g., a model number, a device type, point descriptions of the building device, a name of the building device, a subsystem type (e.g., HVAC, fire, surveillance, etc.).

The building cloud platform 1202 can include a network assigner 1504. The network assigner 1504 can be configured to assign the building device 1502 to one of the virtual networks 402-408 run on the network infrastructure 308 based on the identifying information received from the building device 1502. The network assigner 1504 can be configured to apply one or more assignment rules against the identifying information received from the building device 1502. For example, one rule may indicate that all surveillance cameras be added to a surveillance camera virtual network since the surveillance camera virtual network may have special bandwidth and/or security specific for surveillance cameras, e.g., large bandwidth to stream videos and particular security protocols to reduce the ability for an unauthorized user to gain access to the cameras.

In another embodiment, the network assigner 1504 can add the building device 1502 to a virtual network based on a subsystem of the building devices. For example, an assignment rule may be that all HVAC devices be added to an HVAC device network. If the identifying information received from the building device 1502 indicates the building device 1502 is a thermostat or is otherwise part of an HVAC subsystem, the network assigner 1504 can add the building device 1502 to an HVAC subsystem virtual network.

The virtual network assignment determined by the network assigner 1504 can be communicated to the building device 1502 and/or the virtual network that the building device 1502 is assigned to. In some cases, login and/or network credentials are distributed to the building device 1502 and/or the assigned virtual network. The building device 1502 can be configured to communicate on the virtual network in response to being assigned to the virtual network by the network assigner 1504. For example, the building device 1502 could receive an indication to connect to the second virtual network. Based on the indication to connect to the second virtual network received from the building cloud platform 1202, the building device 1502 can be configured to communicate with other building devices, servers, controllers, etc. via the second virtual network.

Figure 16:
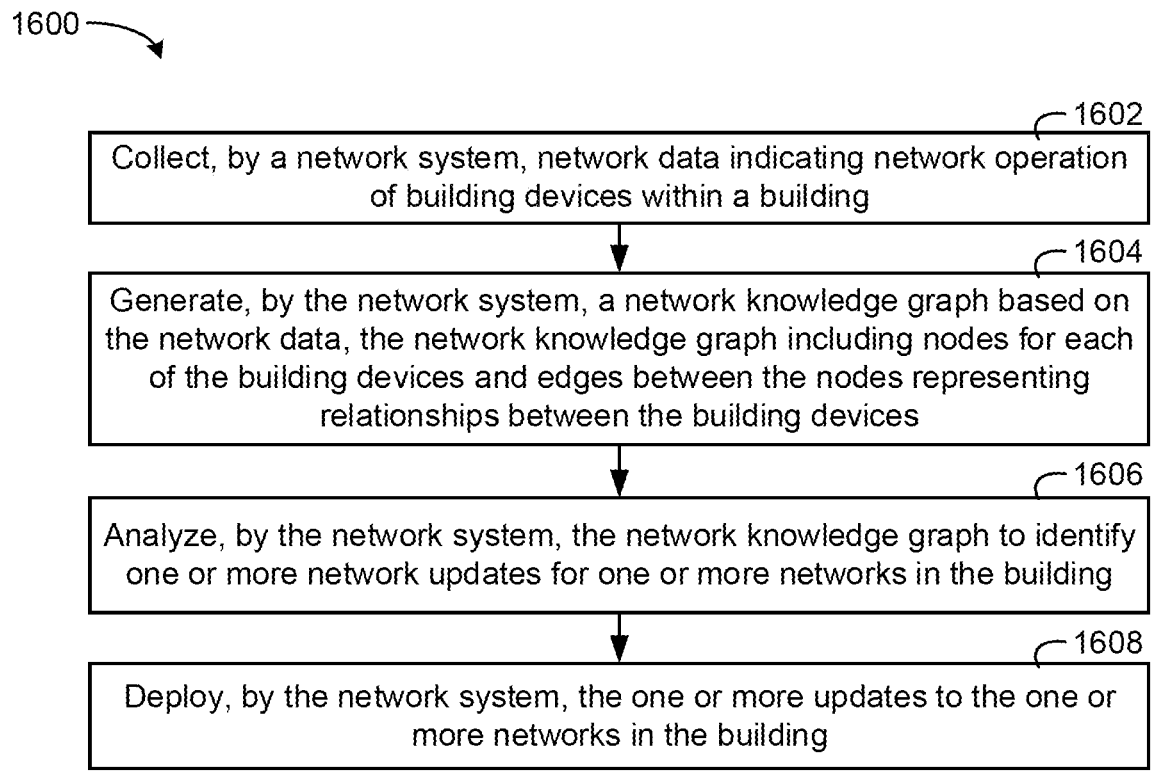
FIG. 16 is a flow diagram of a process of generating a building network graph for managing building networks, according to an exemplary embodiment.

Referring now to FIG. 16, a flow diagram of a process 1600 of generating a building network graph for managing building networks is shown, according to an exemplary embodiment. The process 1600 can be implemented by the processors and memory devices described herein. In the process 1600, the building cloud platform 1202 collects network data indicating network operations of various building devices of a building (step 1602). In some embodiments, the network is a 5G network as described with reference to FIGS. 1-11. The network data may include identifying information that uniquely identifies the building equipment communicating on the network. The network data may further indicate information, for example, temperature measurements, control decisions, physical locations of the equipment within the building, etc.

The network data may further include source and destination information, for example, an address of the building device transmitting the information and a destination of the building device receiving the information. The network data may indicate the various paths which information takes through the network, for example, what switches or network repeaters forward messages from one building device to another.

Based on the collected network data, the building cloud platform 1202 can generate a network knowledge graph (step 1604). The network knowledge graph can include nodes and edges, e.g., the graph shown in FIGS. 12-13. The nodes may represent the building devices, e.g., network equipment such as routers, repeaters, network switches, etc. Edges between the nodes represent relationships between the pieces of equipment. The building cloud platform 1202 can identify the nodes by identifying unique addresses or other identifying information collected from the network. Details of building graphs can be found in U.S. patent application Ser. No. 16/260,078 filed Jan. 28, 2019, U.S. patent application Ser. No. 16/048,052 filed Jul. 27, 2018, U.S. patent application Ser. No. 16/142,803 filed Sep. 26, 2018, U.S. patent application Ser. No. 16/143,243 filed Sep. 26, 2018, and U.S. patent application Ser. No. 16/663,623 filed Oct. 25, 2019, the entirety of each of which is incorporated by reference herein.

The network system can identify relationships between the various pieces of equipment based on the network paths or destinations of messages. For example, the networks system could identify that a thermostat communicates data through a particular small cell network node frequently. This may indicate that a relationship exists between the thermostat and the small cell network node. Accordingly, the network system can cause the network knowledge graph to include a relationship between a first node representing the thermostat and a second node representing the small cell network node. As another example, the network system may identify destinations of the network data. For example, if a thermostat transmits control decisions to a variable air volume (VAV) unit, a relationship between the thermostat and the VAV unit indicating that the thermostat controls the VAV unit.

With the network knowledge graph, the building cloud platform 1202 can analyze the various nodes and relationships of the network knowledge graph to update the operations of the network (step 1606). For example, based on the network knowledge graph, the building cloud platform 1202 could identify that too many devices utilize a particular network switch to transmit data. The building cloud platform 1202 may determine that some of the network data could be passed through a different network switch to improve network operation based on locations of the device (e.g., if the devices are located on the same floor or in the same area of a building). The result of the analysis may be an identification of various network updates for operating the network. Such updates can be implemented for the network through abstraction of the control and functionality of the network through SDN, NFV, and/or virtual networks as described with reference to FIG. 4 and FIG. 12. The network system can deploy the network updates automatically and/or in response to user approval (step 1608).

Figure 17:
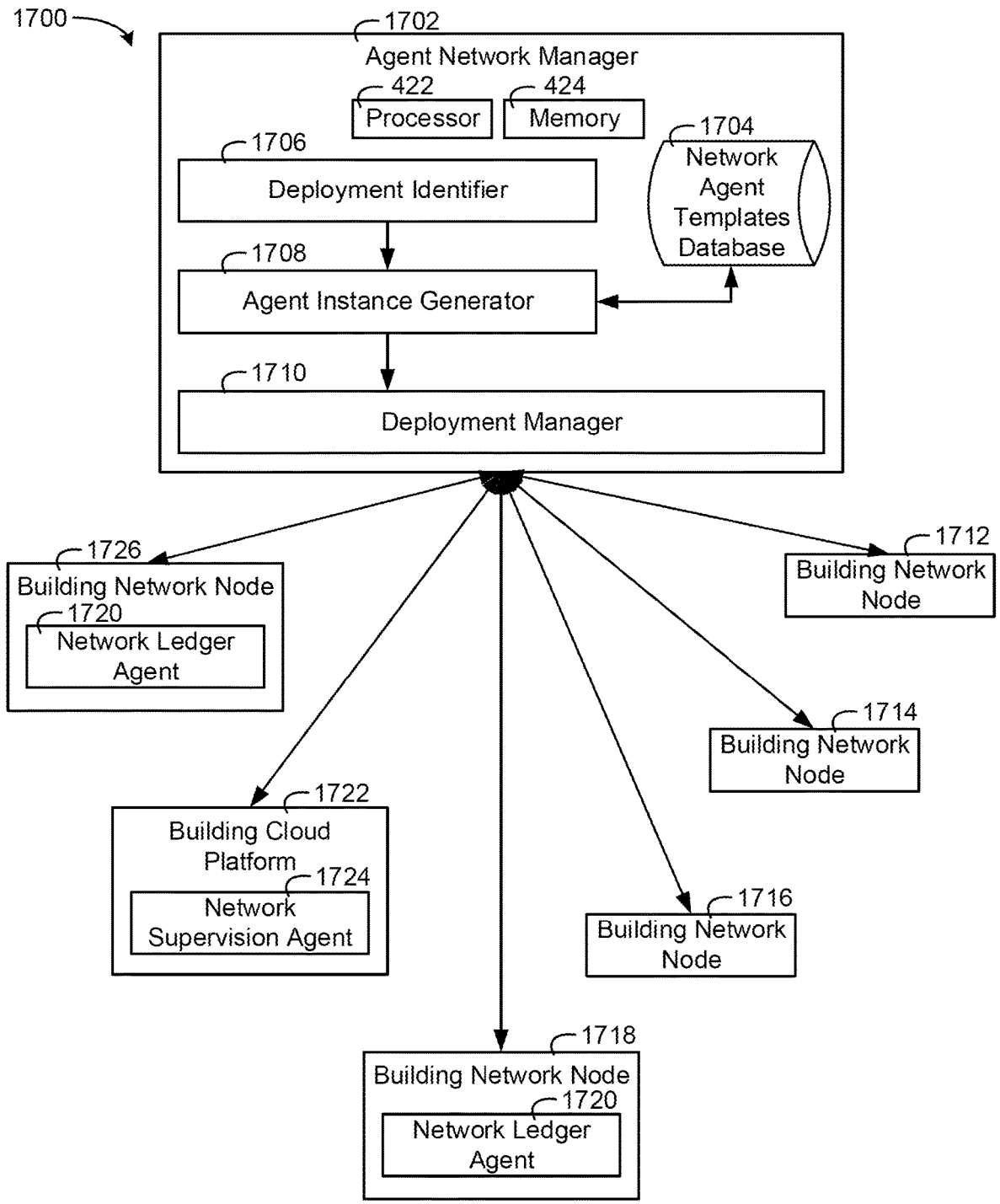
FIG. 17 is a system including an agent network manager, according to an exemplary embodiment.

Referring now to FIG. 17, a system 1700 including an agent network manager 1702 is shown, according to an exemplary embodiment. The agent network manager 1702 can be configured to deploy network agents throughout network nodes of a building, building network nodes 1712-1726. In this regard, machine learning based agents can be deployed by the agent network manager 1702 according to the needs of a building. The agent network manager 1702 includes a deployment identifier 1706 that can determine that a new network agent should be deployed in a building. For example, if a group of building devices need to implement a distributed ledger, the deployment identifier 1706 can identify which devices should be implementing the ledger and can distribute a network ledger agent 1720 to each of the devices where the network ledger agent manages, e.g., the building network node 1718 and the building network node 1726. Similarly, the deployment identifier 1706 could determine that a network supervision agent 1724 should be deployed in the building.

The agent network manager 1702 can include an agent instance generator 1708. The agent instance generator 1708 can receive network agent templates from a database of network agent templates database 1704. Based on a type of agent for deployment that the deployment identifier 1706 identifies, the agent instance generator 1708 can retrieve an appropriate agent template from the database 1704 and configure a particular instance of the agent for deployment to a building device. The configured agent can be deployed by the deployment manager to one of the building network nodes.

Figure 18:
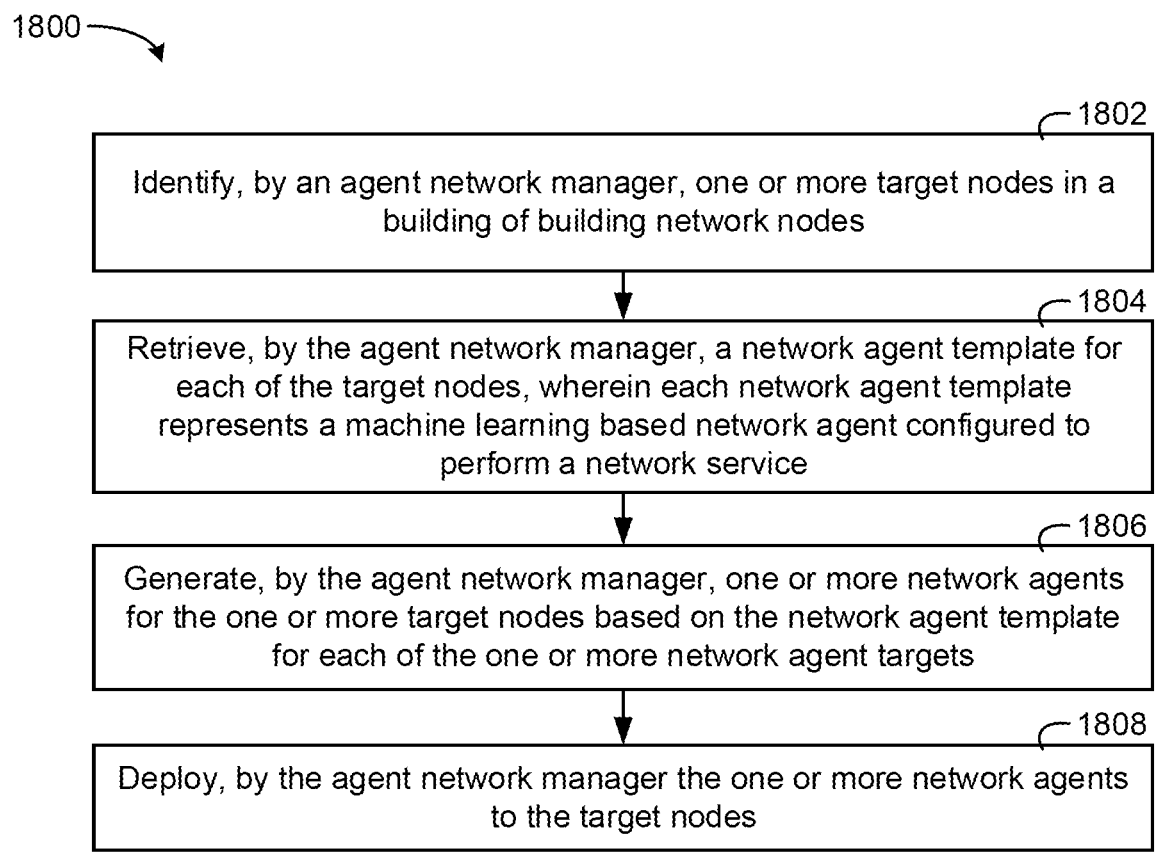
FIG. 18 is a flow diagram of a process of deploying network agents to building nodes of a building network, according to an exemplary embodiment.

Referring now to FIG. 18, a flow diagram of a process 1800 of deploying network agents to building nodes of a building network is shown, according to an exemplary embodiment. The process 1800 can be implemented by the processors and memory devices described herein. The agent network manager 1702 can identify one or more target nodes that require a particular network service to be performed (step 1802). For example, network services may be network supervision, distributed ledger management, bandwidth management, network load management, etc. The agent network manager 1702 can retrieve a network agent template where the template is a template for an agent that can perform the particular network service (step 1804).

With the retrieved network agent template, the agent network manager 1702 can generate one or more instances of the network agent for the one or more target nodes (step 1806). Each agent may be similar and based off of the same template but may be configured based on the target node for which the network agent is destined. Once the network agents are generated, the agent network manager 1702 can deploy the network agents to the appropriate target nodes for operation at each of the target nodes (step 1808). Details on agents can be found in U.S. patent application Ser. No. 15/586,104 filed May 3, 2017, U.S. patent application Ser. No. 15/367,167 filed Dec. 1, 2016, U.S. patent application Ser. No. 15/723,624 filed Oct. 3, 2017, U.S. patent application Ser. No. 15/968,278 filed May 1, 2018, U.S. patent application Ser. No. 16/036,685 Jul. 16, 2018, U.S. patent application Ser. No. 16/008,885 filed Jun. 14, 2018, U.S. patent application Ser. No. 16/533,493 filed Aug. 6, 2019, and U.S. patent application Ser. No. 16/533,499 filed Aug. 6, 2019, the entirety of each of which is incorporated by reference herein.

Figure 19:
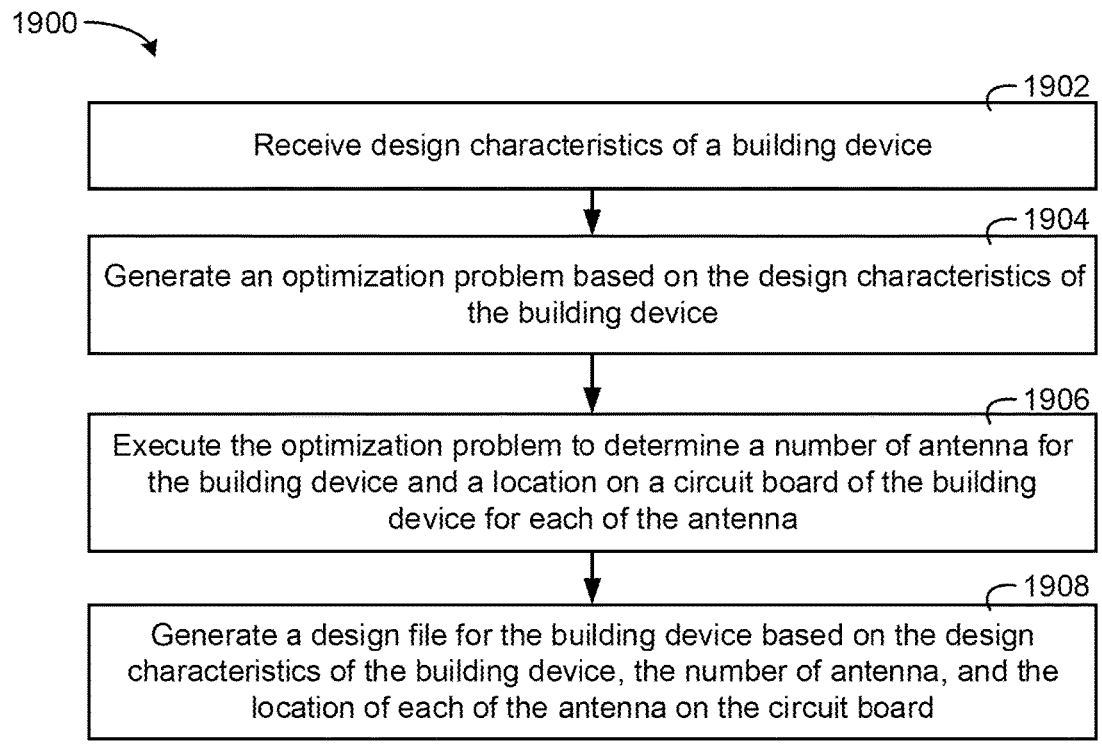
FIG. 19 is a flow diagram of a process of designing an antenna layout for a building device, according to an exemplary embodiment.

Referring now to FIG. 19, a flow diagram of a process 1900 of designing an antenna layout for a building device is shown, according to an exemplary embodiment. The process 1900 can be implemented by the processors and memory devices described herein. The process 1900 of FIG. 19 can be performed by the building cloud platform 1202 and/or any other computing device as described herein. In step 1902, the building cloud platform 1202 can receive design characteristics of a building device. In some embodiments, the design characteristics can include Computer-Aided Design (CAD) files, circuit board layout files, etc. The design characteristics can indicate the mounting orientation of the building device, the component layout (e.g., integrated circuits, resistors, capacitors, transformers, filters, connectors, etc.) of the circuit board of the building device, a number of antenna of the building device, a location of each antenna on the circuit board of the building device, etc.

In step 1904, the building cloud platform 1202 can generate an optimization problem based on the design characteristics of the building device. The optimization problem could be an objective function with multiple equality and/or inequality constraints. In step 1906, the building cloud platform 1202 can execute the optimization problem to determine a number of antenna for the building device and a location on a circuit board of the building device for each of the antenna. The number of antenna and the location of each antenna can be optimized to achieve an optimal connectivity level for a millimeter wave network.

In step 1908, the building cloud platform 1202 generates a design file for the building device. The design file can be based on the design characteristics of the building device received in the first step. The design file can be based on the number of antenna and the location of each antenna on the circuit board of the building device determined in the third step.

Figures 20, 21:
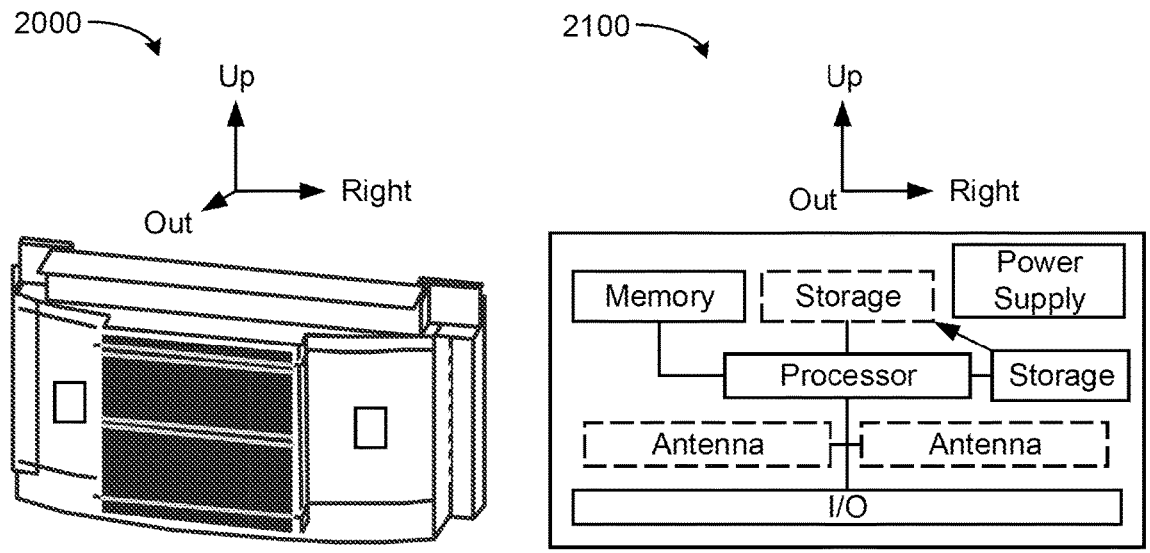
FIG. 20 is a schematic block diagram of a building device with two antenna, according to an exemplary embodiment.
FIG. 21 is a block diagram of a circuit board layout of the building device of FIG. 20, according to an exemplary embodiment.

Referring now to FIG. 20, a schematic block diagram 2000 of a building device with two antenna is shown, according to an exemplary embodiment. The building device of FIG. 20 is a controller configured to communicate via a millimeter wave network with two antenna. The controller includes an enclosure and is mounted in the orientation shown in FIG. 20. The design characteristics used to optimize the number and location of each of the antenna of the building device can be a CAD file describing the controller shown in FIG. 20.

Referring now to FIG. 21, a circuit board layout 2100 of the building device of FIG. 20 is shown, according to an exemplary embodiment. The circuit board layout 2100 includes multiple components, e.g., a memory device, a storage device, a power supply, a processor, an input/output (I/O), and two antenna. The two antenna can be determined in the optimization, i.e., the number of the antenna, i.e., two antenna. Furthermore, the location of each antenna can be determined as part of the optimization. Furthermore, other components can be moved in the circuit board layout 2100 to properly locate the antenna and/or improve the connection of the antenna. For example, the storage device is moved from a first location to a second location to properly position one of the two antenna.

Figure 22:
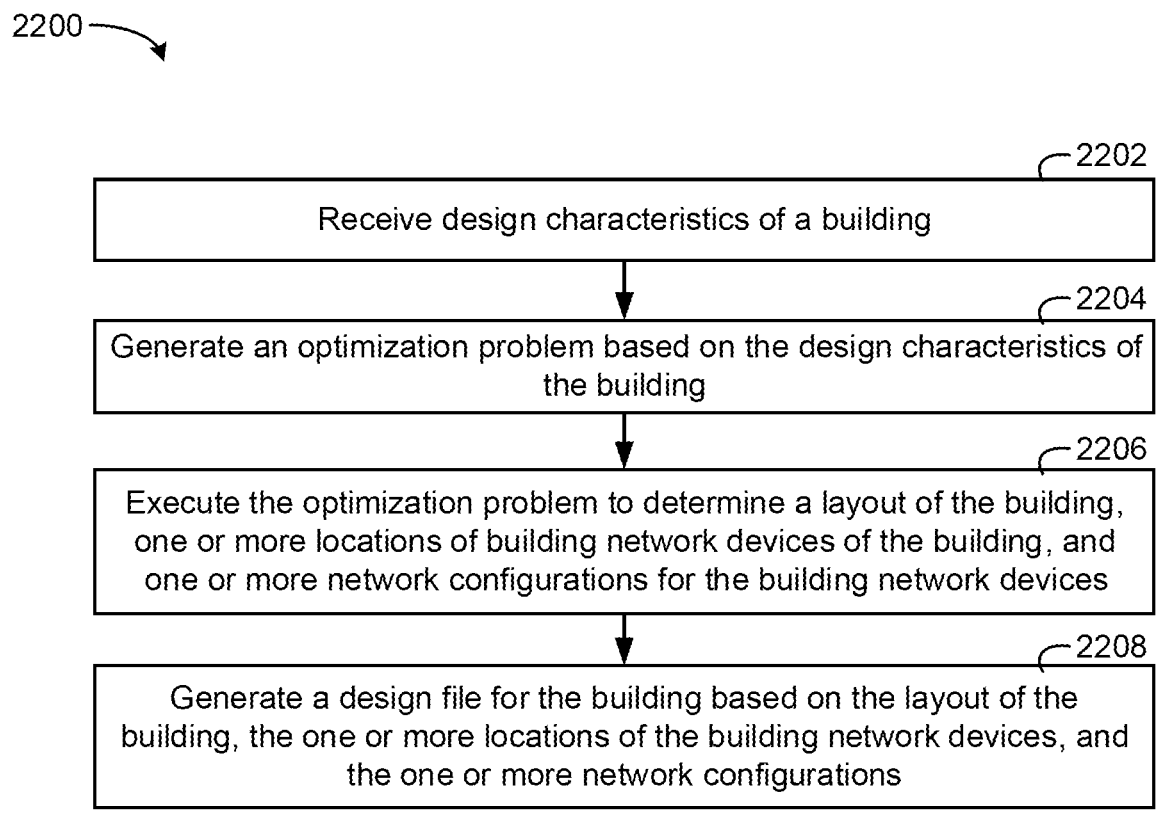
FIG. 22 is a flow diagram of a process of optimizing the floor of a building, according to an exemplary embodiment.

Referring now to FIG. 22, a flow diagram of a process 2200 of optimizing the floor of a building is shown, according to an exemplary embodiment. The process 2200 can be implemented by the processors and memory devices described herein. The process 2200 of FIG. 22 can be performed by the building cloud platform 1202 and/or any other computing device as described herein. In the step 2202, the building cloud platform 1202 can receive design characteristics of a building (e.g., the building of FIG. 9). For example, the design characteristics of the building may be a Building Information Modeling (BIM) file. The design characteristics may identify a construction of a building, e.g., floors, walls, windows, doors, etc. The design characteristics can further indicate a number and location of building devices within the building (e.g., network devices). For example, the location of small cell network nodes of a millimeter wave network can be indicated as part of the design characteristics.

In step 2204, the building cloud platform 1202 can generate an optimization problem based on the design characteristics of the building. The optimization problem may be an objective function, equality constraints, and/or inequality constraints. In step 2206, the building cloud platform 1202 can execute the optimization problem to determine a layout of the building. The layout of the building may optimize the connectivity of a millimeter wave network. The layout of the building can indicate the locations of building devices within the building (e.g., the locations of small cell network nodes). The layout can further indicate network configurations for the building devices.

In step 2206, the building cloud platform 1202 can generate a design file for the building. The design file can be based on the layout of the building determined in the optimization. Furthermore, the design file can be based on the locations of each of the building devices determined as part of the optimization. The design file can be based on the network configurations for the building devices determined as part of the optimization. The network configurations can be manufacturer usage description (MUD) files.

Figure 23:
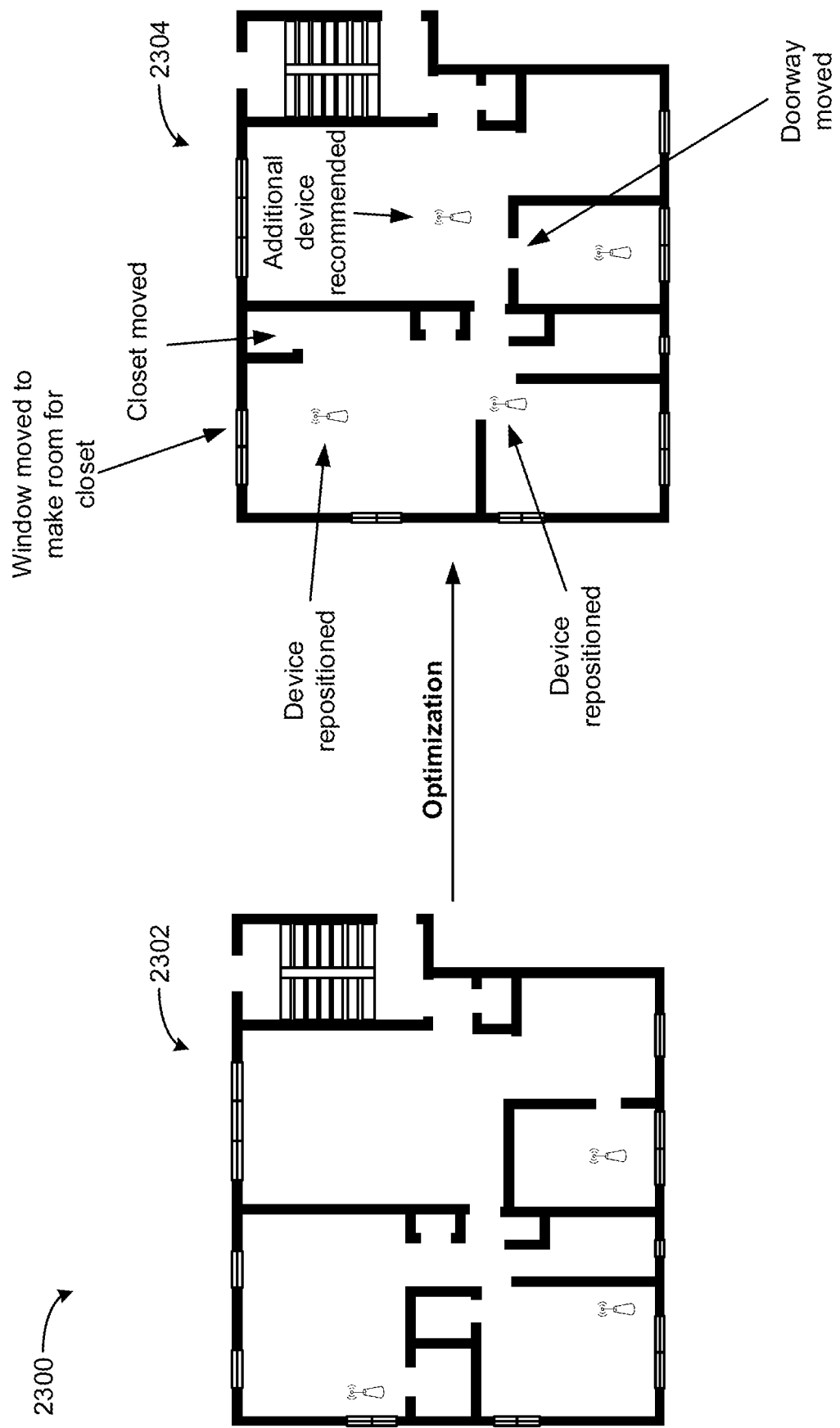
FIG. 23 is a schematic diagram of the floor of the building optimized according to the process of FIG. 22, according to an exemplary embodiment.

Referring now to FIG. 23, a schematic diagram of a floor 2300 of a building that is optimized according to the process 2200 of FIG. 22 is shown, according to an exemplary embodiment. FIG. 23 illustrates one floor 2300 of a building. The first version 2302 of the building floor 2300 indicates the building floor 2300 before optimization, e.g., the design characteristics of the floor. For example, the locations of rooms, windows, stairs, walls, and small cell network nodes is shown in the first version 2302 of the building floor 2300. As shown in the second version 2304 of the floor 2300, the result of the optimization can be repositioning the small cell network nodes of the building. Furthermore the result of the optimization can be adding an additional small cell network node. Furthermore, the result of the optimization can be moving a door window, and/or closet.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A building network system of a building comprising one or more processing circuits configured to:
   receive network data from a building network of the building, the network data associated with a plurality of pieces of building equipment of the building;
   generate a digital network twin of the building network based on the network data, the digital network twin representing the plurality of pieces of building equipment and relationships between the plurality of pieces of building equipment;
   identify one or more network updates to the building network based on the digital network twin; and
   deploy the one or more network updates to the building network.

2. The building network system of claim 1, wherein the relationships between the plurality of pieces of building equipment include operational relationships indicating a first piece of building equipment operating a second piece of building equipment and a network communication relationship indicating network communications associated with the first piece of building equipment and the second piece of building equipment.

3. The building network system of claim 1, wherein the one or more network updates comprise one or more routing updates to rout data through the building network or one or more network function updates to implement or modify one or more network functions of the building network.

4. The building network system of claim 1, wherein the one or more processing circuits are configured to:
   generate a user interface indicating the one or more network updates and including an element to approve the one or more network updates or reject the one or more network updates;
   cause a user device of a user to display the user interface and receive an interaction with the element to approve the one or more network updates or reject the one or more network updates; and
   deploy the one or more network updates to the building network in response to a reception of the interaction with the element to approve the one or more network updates.

5. The building network system of claim 1, wherein the building network includes a millimeter wave based network.

6. The building network system of claim 5, wherein the millimeter wave based network is a fifth generation (5G) cellular network.

7. The building network system of claim 1, wherein the digital network twin is a network knowledge graph comprising a plurality of nodes and a plurality of edges between the plurality of nodes, wherein the network knowledge graph represents the plurality of pieces of building equipment with the plurality of nodes and the relationships between the plurality of pieces of building equipment with the plurality of edges.

8. The building network system of claim 7, wherein the network knowledge graph comprises a second plurality of nodes representing network infrastructure devices that are at least one of inside the building or outside the building, wherein the network infrastructure devices are at least one of network switches, network routers, small cell network nodes, or cellular base stations.

9. The building network system of claim 7, wherein the network knowledge graph comprises a second plurality of nodes representing spaces of the building and a second plurality of edges between the plurality of nodes and the second plurality of nodes;
   wherein the second plurality of edges indicate that the plurality of pieces of building equipment are located in the spaces of the building.

10. A method, comprising:
    receiving, by one or more processing circuits, network data from a building network of a building, the network data associated with a plurality of pieces of building equipment of the building;
    generating, by the one or more processing circuits, a digital network twin of the building network based on the network data, the digital network twin representing the plurality of pieces of building equipment and relationships between the plurality of pieces of building equipment;
    identifying, by the one or more processing circuits, one or more network updates to the building network based on the digital network twin; and
    deploying, by the one or more processing circuits, the one or more network updates to the building network.

11. The method of claim 10, wherein the relationships between the plurality of pieces of building equipment are at least one of operational relationships indicating a first piece of building equipment operating a second piece of building equipment or a network communication relationship indicating network communications associated with the first piece of building equipment and the second piece of building equipment.

12. The method of claim 10, wherein the one or more network updates comprise one or more routing updates to rout data through the building network or one or more network function updates to implement or modify one or more network functions of the building network.

13. The method of claim 10, comprising:
   generating, by the one or more processing circuits, a user interface indicating the one or more network updates and including an element to approve the one or more network updates or reject the one or more network updates;
   causing, by the one or more processing circuits, a user device of a user to display the user interface and receive an interaction with one of the element to approve the one or more network updates or reject the one or more network updates; and
   deploying, by the one or more processing circuits, the one or more network updates to the building network in response to a reception of the interaction with the element to approve the one or more network updates.

14. The method of claim 10, wherein the building network is an infrastructure of a millimeter wave based network.

15. The method of claim 14, wherein the millimeter wave based network is a fifth generation (5G) cellular network.

16. The method of claim 10, wherein the digital network twin is a network knowledge graph comprising a plurality of nodes and a plurality of edges between the plurality of nodes, wherein the network knowledge graph represents the plurality of pieces of building equipment with the plurality of nodes and the relationships between the plurality of pieces of building equipment with the plurality of edges.

17. The method of claim 16, wherein the network knowledge graph comprises a second plurality of nodes representing network infrastructure devices that are at least one of inside the building or outside the building, wherein the network infrastructure devices are at least one of network switches, network routers, small cell network nodes, or cellular base stations.

18. The method of claim 16, wherein the network knowledge graph comprises a second plurality of nodes representing spaces of the building and a second plurality of edges between the plurality of nodes and the second plurality of nodes;
   wherein the second plurality of edges indicate that the plurality of pieces of building equipment are located in the spaces of the building.

19. One or more non-transitory, computer-readable storage media storing instructions thereon that, when executed by one or more processors, cause the one or more processors to: receive network data from a building network of a building, the network data associated with a plurality of pieces of building equipment of the building; generate a digital network twin of the building network based on the network data, the digital network twin representing the plurality of pieces of building equipment and relationships between the plurality of pieces of building equipment; and provide at least a portion of the digital network twin to a system to identify one or more network updates to the building network based on the digital network twin and deploy the one or more network updates to the building network.

20. The one or more non-transitory, computer-readable storage media of claim 19, wherein the relationships between the plurality of pieces of building equipment include operational relationships indicating a first piece of building equipment operating a second piece of building equipment and a network communication relationship indicating network communications associated with the first piece of building equipment and the second piece of building equipment.

* * * * *